(12) United States Patent
Nonomura et al.

(10) Patent No.: US 6,574,419 B1
(45) Date of Patent: Jun. 3, 2003

(54) OPTICAL DISK, REPRODUCTION APPARATUS REPRODUCTION METHOD, AND RECORDING MEDIUM

(75) Inventors: Tomoyuki Nonomura, Osaka (JP); Masaya Yamamoto, Osaka (JP); Yoshihiro Mori, Osaka (JP); Yasushi Uesaka, Hyogo (JP); Masayuki Kozuka, Arcadia, CA (US)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/525,336

(22) Filed: Mar. 10, 2000

(30) Foreign Application Priority Data

Mar. 12, 1999 (JP) .......................... 11-067559

(51) Int. Cl.[7] .............................. H04N 5/91
(52) U.S. Cl. ..................... 386/95; 386/126; 386/96
(58) Field of Search ................. 386/46, 96, 104, 386/105, 106, 125, 126, 121, 95; 358/909.1

(56) References Cited

U.S. PATENT DOCUMENTS

| | | | |
|---|---|---|---|
| 4,794,465 A | | 12/1988 | Van Luyt et al. |
| 5,555,098 A | * | 9/1996 | Paruiski ...................... 386/104 |
| 5,630,006 A | | 5/1997 | Hirayama et al. |
| 5,684,804 A | | 11/1997 | Baronetti et al. |
| 5,687,160 A | * | 11/1997 | Aotake et al. ............... 386/126 |
| 5,870,523 A | | 2/1999 | Kikuchi et al. |
| 5,875,303 A | | 2/1999 | Hulzer et al. |
| 6,067,400 A | * | 5/2000 | Saeki et al. ................. 386/125 |
| 6,122,436 A | * | 9/2000 | Okada et al. ................ 386/126 |
| 6,157,769 A | * | 12/2000 | Yoshimura et al. ........... 386/95 |

FOREIGN PATENT DOCUMENTS

| | | |
|---|---|---|
| EP | 0757350 | 2/1997 |
| EP | 0892404 | 1/1999 |
| EP | 0942609 | 3/1999 |
| EP | 0910082 | 4/1999 |
| EP | 0951021 | 10/1999 |
| JP | 11331780 | 11/1999 |
| KR | 2001-0022703 | 3/2001 |
| KR | 2001-0022704 | 3/2001 |
| WO | 9414159 | 6/1994 |
| WO | 99/08281 | 2/1999 |
| WO | 99/08282 | 2/1999 |

OTHER PUBLICATIONS

Office Action dated Sep. 24, 2002 regarding Korean Patent Application No. 10–2000–7012703.

* cited by examiner

*Primary Examiner*—Huy Nguyen
(74) *Attorney, Agent, or Firm*—Renner, Otto, Boisselle & Sklar

(57) ABSTRACT

An optical disk includes an audio data storage area for storing audio data; a still picture data storage area for storing a plurality of pieces of still picture data; and a management area for storing reproduction control information for controlling reproduction of the audio data and the plurality of pieces of still picture data. The reproduction control information has flag information representing specified still picture data among the plurality of pieces of still picture data.

8 Claims, 31 Drawing Sheets

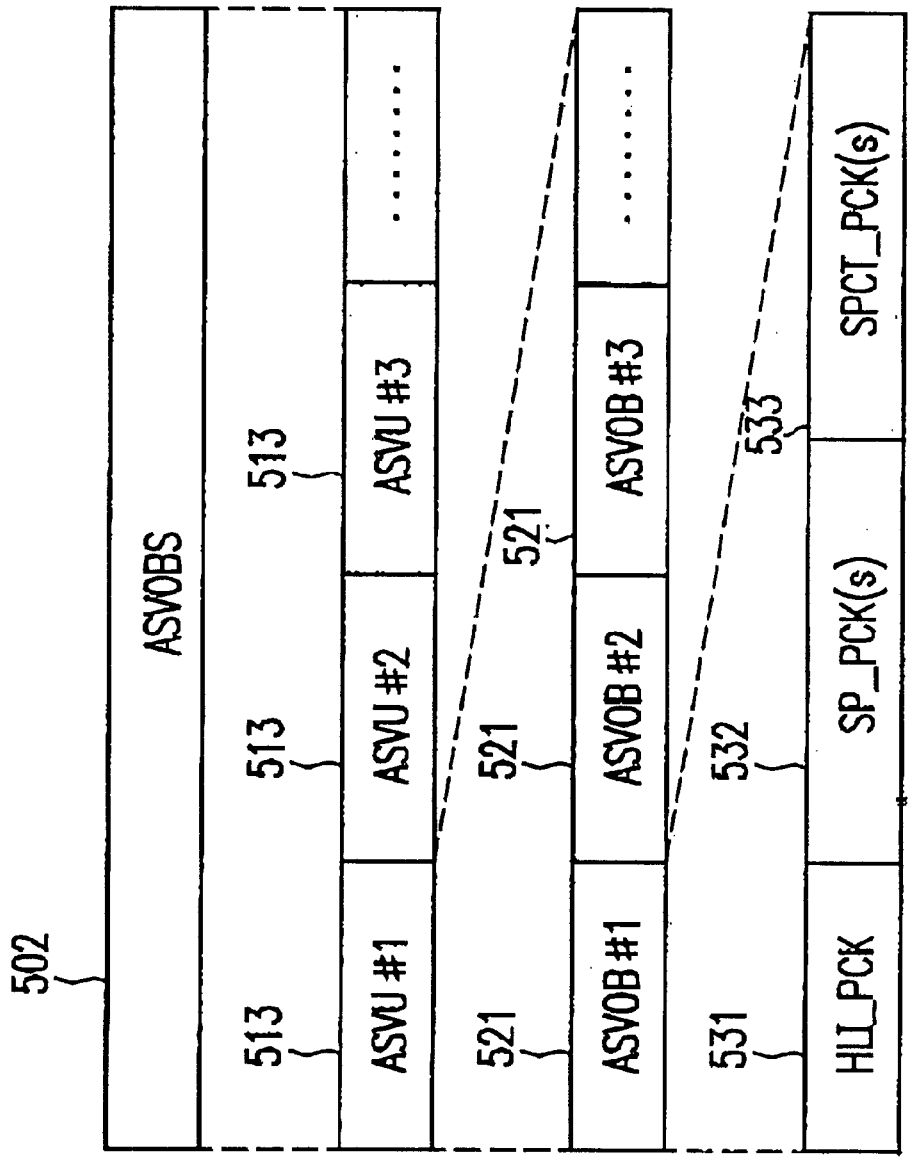

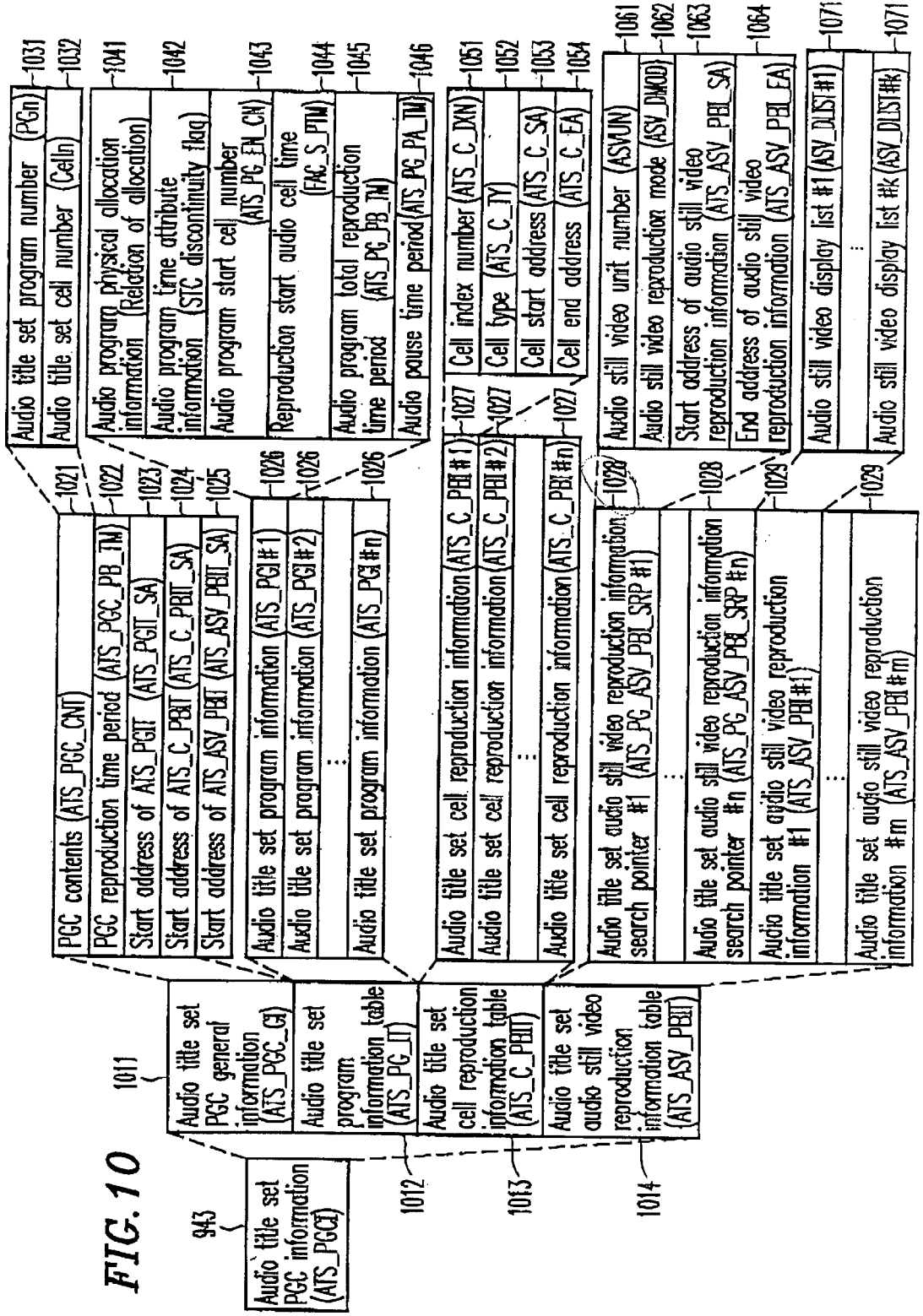

FIG. 11A

| | |
|---|---|
| ASV number | ~1101 |
| Specified video stream existence flag (Entry DLIST flag) | ~1102 |
| FOSL BTNN:Forcedly selected button number | ~1103 |
| Program number | ~1104 |
| Display timing information | ~1105 |
| Start effect mode | ~1106 |
| End effect mode | ~1107 |
| Start effect period | ~1108 |
| End effect period | ~1109 |

FIG. 11B

| | |
|---|---|
| Reserved | |
| Specified video stream existence flag (Entry DLIST flag) | ~1102 |
| FOSL BTNN:Forcedly selected button number | ~1103 |
| Program number | ~1104 |
| Display timing information | ~1105 |
| Start effect mode | ~1106 |
| End effect mode | ~1107 |
| Start effect period | ~1108 |
| End effect period | ~1109 |

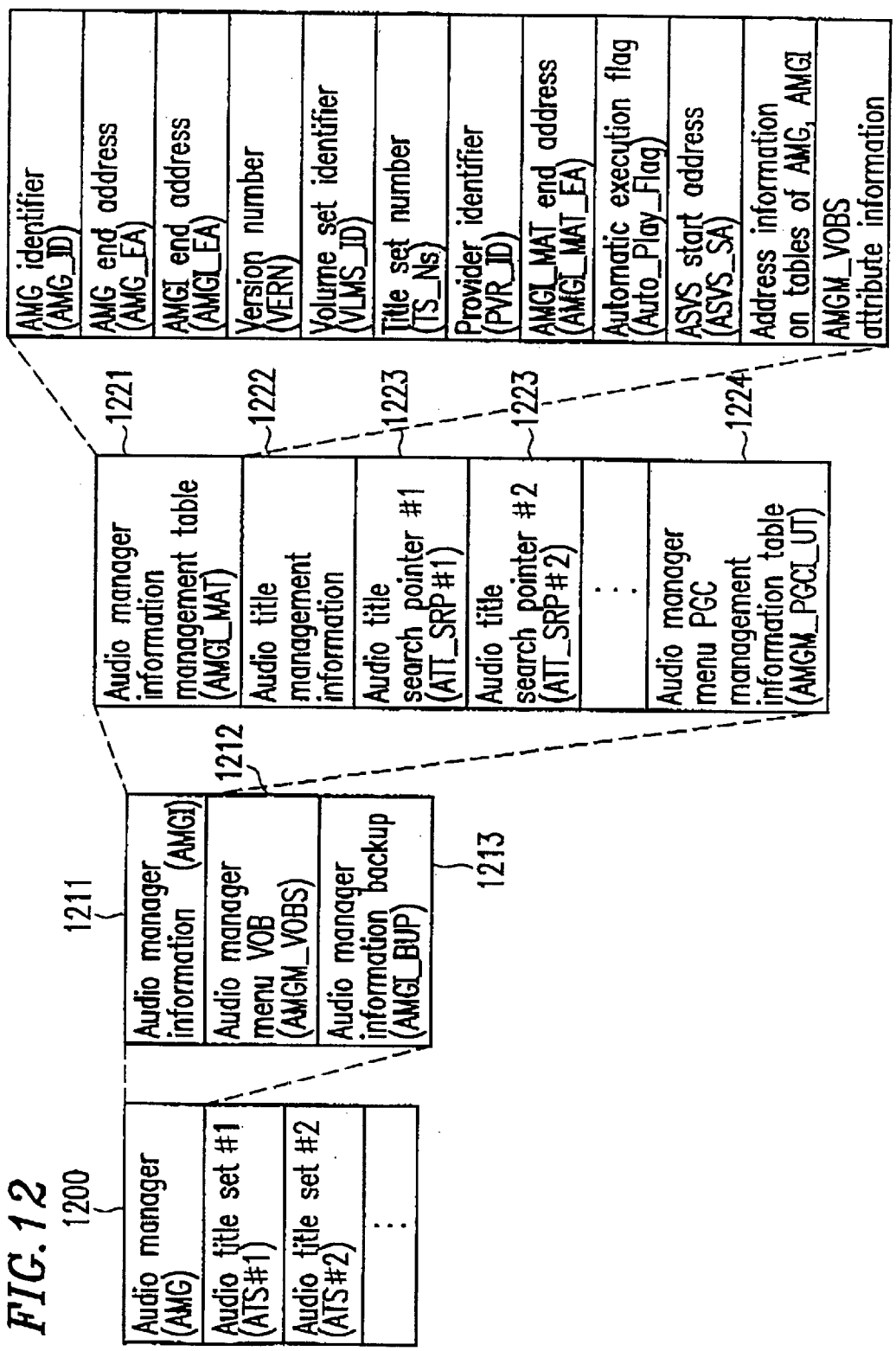

FIG.15

| | Physical allocation information | Time attribute information | Start cell number | Reproduction start audio cell time | Audio program total reproduction time period | Audio pause time period | ASVU number | ASV reproduction mode | ATS_ASV_PBI start address | ATS_ASV_PBI end address |
|---|---|---|---|---|---|---|---|---|---|---|
| | 1041 | 1042 | 1043 | 1044 | 1045 | 1046 | 1061 | 1062 | 1063 | 1064 |
| Audio program #1 | No-Continue | No-Continue | 1 | 90,000 | 5,490,000 | 90,000 | 1 | SlideShow | (Leading address of #1) | (Final address of #1) |
| Audio program #2 | Continue | No-Continue | 3 | 90,000 | 10,890,000 | 90,000 | 1 | SlideShow | (Leading address of #1) | (Final address of #1) |
| Audio program #3 | No-Continue | No-Continue | 6 | 90,000 | 5,490,000 | 90,000 | 2 | Browsable | (Leading address of #2) | (Final address of #2) |
| Audio program #4 | Continue | Continue | 8 | 5,490,000 | 5,400,000 | 0 | 2 | Browsable | (Leading address of #2) | (Final address of #2) |

FIG. 16A

ATS_ASV_PBI#1

| | 1101<br>ASV number | 1102<br>Specified video stream existence flag | 1103<br>Forcedly selected button number | 1104<br>Audio program number | 1105<br>Display timing information | 1106<br>Start effect mode | 1108<br>Start effect duration | 1107<br>End effect mode | 1109<br>End effect duration |
|---|---|---|---|---|---|---|---|---|---|
| Display list #1 | 1 | 1 | 1 | 1 | 90,000 | 1 | 352 | 1 | 352 |
| Display list #2 | 2 | 0 | 2 | 2 | 90,000 | 1 | 352 | 1 | 352 |
| Display list #3 | 3 | 0 | 3 | 2 | 5,580,000 | 1 | 352 | 2 | 352 |

ATS_ASV_PBI #2

| | 1101 ASV number | 1102 Specified video stream existence flag | 1103 Forcedly selected button number | 1104 Audio program number | 1111 Maximum display time information | 1112 Minimum display time information | 1106 Start effect mode | 1108 Start effect duration | 1107 End effect mode | 1109 End effect duration |
|---|---|---|---|---|---|---|---|---|---|---|
| Display list #1 | 4 | 0 | 4 | 3 | 5,490,000 | 5,490,000 | 2 | 352 | 2 | 352 |
| Display list #2 | 5 | 0 | 5 | 4 | 5,490,000 | 5,490,000 | 2 | 352 | 2 | 352 |

FIG.17

| | Cell index number 1051 | Cell type 1052 | Cell start address 1053 | Cell end address 1054 |
|---|---|---|---|---|
| Cell #1 | 0 | Silent | 0 | 95 |
| Cell #2 | 1 | Audio | 96 | 14,975 |
| Cell #3 | 0 | Silent | 14,976 | 15,071 |
| Cell #4 | 1 | Audio | 15,072 | 20,831 |
| Cell #5 | 2 | Audio | 20,832 | 26,591 |
| Cell #6 | 0 | Silent | 26,592 | 26,687 |
| Cell #7 | 1 | Audio | 26,688 | 41,567 |
| Cell #8 | 2 | Audio | 41,568 | 56,443 |

(bracket label: 1027)

FIG.18

| | ASV start address |
|---|---|
| ATS_PG_ASV_PBI #1 | 0 |
| ATS_PG_ASV_PBI #2 | 50 |
| ATS_PG_ASV_PBI #3 | 100 |
| ATS_PG_ASV_PBI #4 | 150 |
| ATS_PG_ASV_PBI #5 | 200 |

FIG.19

| | ASVOB number | Start ASVOB number |
|---|---|---|
| ASVU_GI #1 | 3 | 1 |
| ASVU_GI #2 | 2 | 4 |

OPTICAL DISK, REPRODUCTION APPARATUS REPRODUCTION METHOD, AND RECORDING MEDIUM

BACKGROUND OF THE INVENTION

1. Field of the Invention

The present invention relates to an optical disk having audio data and still picture data recorded thereon, a reproduction apparatus and a reproduction method for reproducing information recorded on the optical disk, and a recording medium having a program stored thereon for causing the reproduction apparatus to carrying out a method for reproducing information recorded on the optical disk.

2. Description of the Related Art

One application for a DVD-Audio is a "slide show" application for reproducing a plurality of still pictures in a prescribed order synchronously with (or asynchronously with) reproduction of audio information. A typical "slide show" application is a music application for sequentially displaying still pictures related to the lyrics of a song synchronously with reproduction of the song.

In a conventional music application, a plurality of still pictures to be displayed for a specific song and the order of displaying the plurality of still pictures are predetermined.

Title producers have demanded a system in which a plurality of still picture groups are prepared for a specific song and one of the still picture groups is selectively displayed. Herein, the term "still picture group" refers to a group of a plurality of still pictures.

In order to select one of the plurality of still picture groups in accordance with an input from a user, a menu needs to be displayed. Preferably, such a menu can be retrieved at an arbitrary time by operating a button on a device such as a remote control or the like.

However, the contents of the menu are different from one song to another. Providing a menu retrieval button for each song requires many menu retrieval buttons, which makes operation by a remote control or other devices difficult.

SUMMARY OF THE INVENTION

According to an aspect of the invention, an optical disk includes an audio data storage area for storing audio data, a still picture data storage area for storing a plurality of pieces of still picture data; and a management area for storing reproduction control information for controlling reproduction of the audio data and the plurality of pieces of still picture data. The reproduction control information has flag information representing specified still picture data among the plurality of pieces of still picture data.

In one embodiment of the invention, the flag information represents that the specified still picture data is not included in the plurality of pieces of still picture data.

According to another aspect of the invention, a reproduction apparatus for reproducing information stored on the above-described optical disk is provided. The reproduction apparatus includes a reading section f or reading the audio data and the plurality of pieces of still picture data from the optical disk; and a reproduction control section for controlling reproduction of the audio data and the plurality of pieces of still picture data in accordance with the reproduction control information. The reproduction control section specifies the specified still picture data among the plurality of pieces of still picture data in accordance with the flag information.

In one embodiment of the invention, the flag information represents that the specified still picture data is not included in the plurality of pieces of still picture data.

According to still another aspect of the invention, a reproduction method for reproducing information stored on the above-described optical disk is provided. The method includes the steps of reading the audio data and the plurality of pieces of still picture data from the optical disk; and controlling reproduction of the audio data and the plurality of pieces of still picture data in accordance with the reproduction control information. The step of controlling includes the step of specifying the specified still picture data among the plurality of pieces of still picture data in accordance with the flag information.

In one embodiment of the invention, the flag information represents that the specified still picture data is not included in the plurality of pieces of still picture data.

According to still another aspect of the invention, a recording medium having recorded thereon a program for causing a reproduction apparatus to carry out a reproduction method for reproducing information stored on the above-described optical disk is provided. The reproduction method includes the steps of reading the audio data and the plurality of pieces of still picture data from the optical disk; and controlling reproduction of the audio data and the plurality of pieces of still picture data in accordance with the reproduction control information. The step of controlling includes the step of specifying the specified still picture data among the plurality of pieces of still picture data in accordance with the flag information.

In one embodiment of the invention, the flag lnformation represents that the specified still picture data is not included in the plurality of pieces of still picture data.

Thus, the invention described herein makes possible the advantages of providing an optical disk, a reproduction apparatus, a reproduction method, and a recording medium for allowing specific still picture data (for example, a menu) which is different among a plurality of audio programs (for example, a plurality of songs) included in an audio title set to be retrieved by operating a common button.

These and other advantages of the present invention will become apparent to those skilled in the art upon reading and understanding the following detailed description with reference to the accompanying figures.

BRIEF DESCRIPTION OF THE DRAWINGS

FIG. 6B is a diagram illustrating a data structure of the audio still video unit 513;

FIG. 10 is a diagram illustrating a data structure of PGC information 943;

FIG. 11A is a diagram illustrating a data structure of an audio still video display list 1071;

FIG. 11B is a diagram illustrating a data structure of the audio still video display list 1071;

FIG. 12 is a diagram illustrating a data structure of an audio manager 1200;

FIG. 15 is a diagram showing exemplary contents of program information 1026 and an audio still video reproduction information search pointer 1028;

FIG. 16A is a diagram showing exemplary contents of audio still video reproduction information (ATS_ASV_PBI#1) 1029;

FIG. 16B is a diagram showing exemplary contents of audio still video reproduction information (ATS_ASV_PBI#2) 1029;

FIG. 17 is a diagram showing exemplary contents of cell reproduction information 1027;

FIG. 18 is a diagram showing exemplary contents of ATS_PG_ASV_PBI#1 through #5;

FIG. 19 is a diagram showing exemplary contents of audio still video unit general information (ASVU_GI);

DESCRIPTION OF THE EMBODIMENTS

Hereinafter, the present invention will be described by way of illustrative examples with reference to the accompanying drawings.

First, a structure of the optical disk will be described.

(1) Physical Structure of an Optical Disk

Figure 1A:
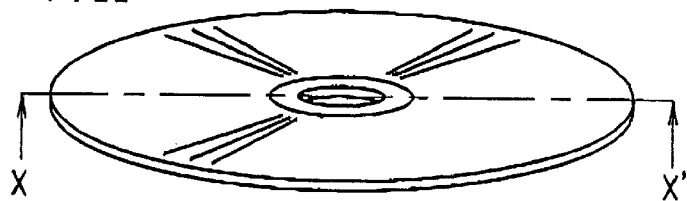
FIG. 1A is an external view of an optical disk 100 in an example according to the present invention.
Figure 1B:
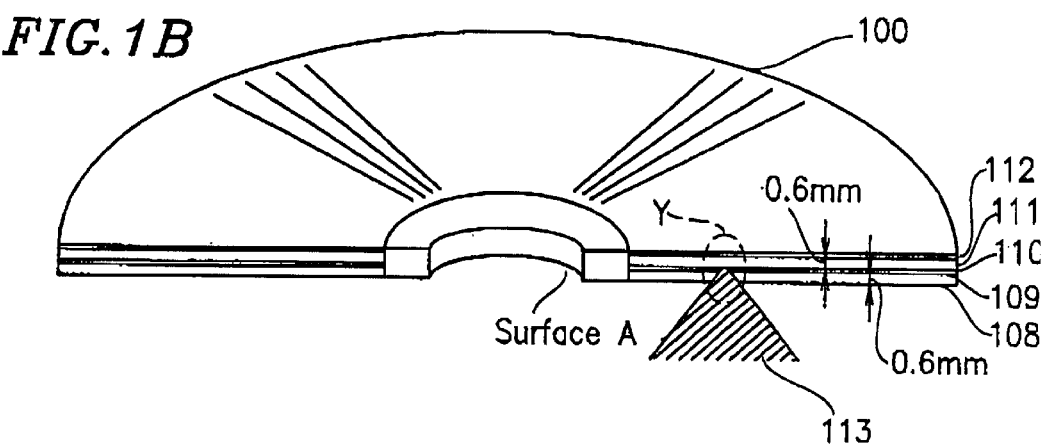
FIG. 1B is a view illustrating a cross-section of the optical disk 100.
Figure 1C:
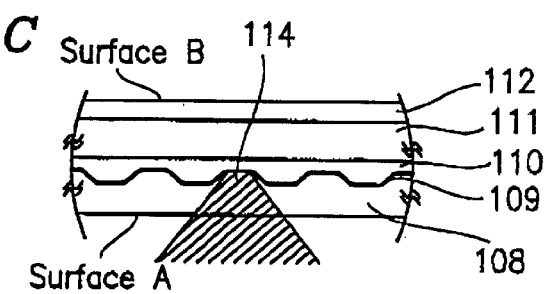
FIG. 1C is a view illustrating an enlarged cross-section of the optical disk 100.

FIG. 1A is an external view of an optical disk 100 in an example according to the present invention. The optical disk 100 is for example, a DVD which is a multi-media optical disk. FIG. 1B is a view showing a cross-section of the optical disk 100 taken long line X–X' in FIG. 1A. FIG. 1C is an enlarged view of section Y shown in FIG. 1B.

As shown in FIG. 1B, the optical disk 100 is formed by laminating a first transparent substrate 105, an information layer 109, an adhesive layer 110, a second transparent layer 111, and a printing layer 112 for printing a label, in this order.

The first transparent substrate 108 and the second transparent substrate 111 are reinforcing substrates formed of an identical material. In the example shown in FIG. 1B, the first transparent substrate 108 and the second transparent substrate 111 each have a thickness of about 0.6 mm. The first transparent substrate 108 and the second transparent substrate 111 can have a thickness in the range of about 0.5 mm to about 0.7 mm.

The adhesive layer 110 is provided between the information layer 109 and the second transparent substrate 111 in order to adhere the information layer 109 and the second transparent substrate 111.

Among the two main surfaces of the information layer 109, the main surface in contact with the first transparent substrate 108 has a reflective film (not shown) provided thereon. The reflective film is formed of a thin metal film or the like. The reflective film has concave and convex pits which are formed at a high density by a molding technology.

Figure 1D:
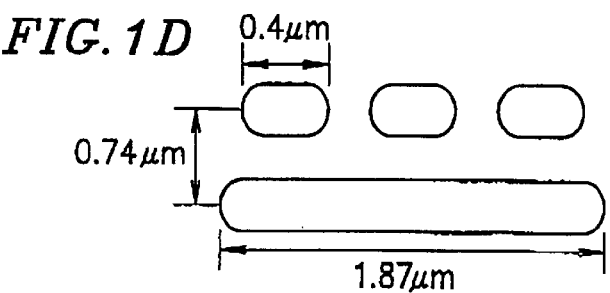
FIG. 1D is a view illustrating pits formed in the optical disk 100.

FIG. 1D shows a shape of the pits formed in the reflective film. In the example shown in FIG. 1D, each pit has a length of about 0.4 $\mu$m to about 2.13 $\mu$m. The optical disk 100 has one spiral track formed therein. Each pit is formed along the spiral track so that two pits adjacent in the radial direction of the optical disk 100 are about 0.74 $\mu$m apart from each other. Thus, a plurality of pits are formed in the spiral track.

When the optical disk 100 is irradiated by an optical beam 113, an optical spot 114 is formed on the information layer 109 as shown in FIG. 1C. Information stored on the optical disk 100 is detected as a change in the reflectance of a portion of the information layer 109 irradiated with the optical spot 114.

The diameter of the optical spot 114 on the optical disk 100 to about $1/1.6$ of the diameter of an optical spot on a CD (compact disk). The reason is that the numeral aperture (NA) of an objective lens for the optical disk 100 is larger than the numerical aperture NA of an objective lens for the CD, and the wavelength $\lambda$ of the optical beam for the optical disk 100 is shorter than the wavelength $\lambda$ for the CD.

The optical disk 100 having such a physical structure can have about 4.7 Gbyte of information stored on one side thereof. The capacity of about 4.7 Gbytes is close to 8 times the recording capacity of the conventional CD. Such a large recording capacity of the optical disk 100 can significantly improve the quality of moving pictures, and also can significantly extend the reproduction time period of moving pictures. Whereas the reproduction time period of the conventional video CD is 74 minutes, the reproduction time period of the DVD is 2 hours or more.

The fundamental technology which realized such a large recording capacity is the reduction in the spot diameter D of the optical beam. The spot diameter D is given by the expressions: spot diameter D=wavelength $\lambda$ of the laser beam/numerical aperture NA of the objective lens. Accordingly, the spot diameter D can be reduced by shortening the wavelength $\lambda$ of the laser beam and increasing the numerical aperture NA of the objective lens. It should be noted that when the numerical aperture NA of the objective lens is increased, frame aberration occurs due to the relative inclination (i.e., tilt) of the surface of the optical disk 100 with respect to the axis of the optical beam. For the optical disk 100, the frame aberration is reduced by reducing the thickness of the first and/or second transparent substrates 108 and 111. When the thickness of the first and/or second transparent substrates 108 and 111 is reduced, there can be another problem that the mechanical strength of the optical disk 100 is lowered. The strength of the optical disk 100 to reinforced by providing another substrate to the first and/or second transparent substrates 108 and 111, thus solving the problem of the mechanical strength.

In order to read information recorded on the optical disk 100, red semiconductor laser light having a wavelength as short as 650 nm and an objective lens having a numerical aperture (NA) as large as about 0.6 mm are used. By further using a transparent substrate as thin as about 0.6 mm as each of the first and second transparent substrates 108 and 111, information of about 4.7 Gbytes is allowed to be recorded on one side of the optical disk 100 having a diameter of 120 mm.

Figure 2A:
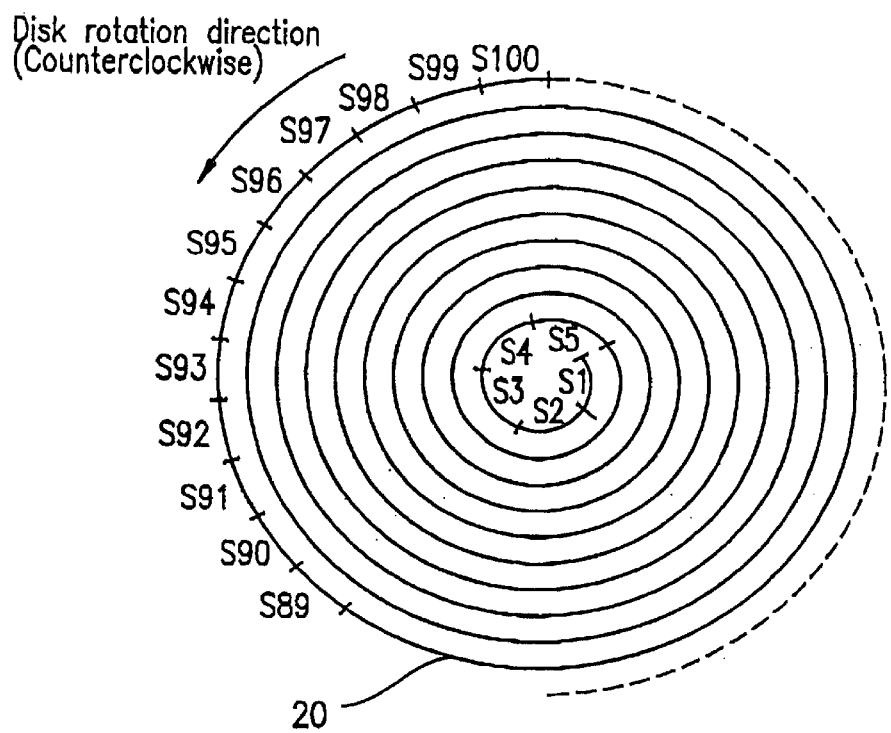
FIG. 2A is a view illustrating a track of the optical disk 100.

FIG. 2A schematically shows a spiral track 20 is formed in the information layer 109 of the optical disk 100 from an inner portion toward an outer periphery. The spiral track 20 is divided into prescribed units referred to as sectors. In FIG. 2A, the sectors are represented by S1, S2, ... S99 and S100. Information recorded on the optical disk 100 is read on a sector-by-sector basis.

Figure 2B:
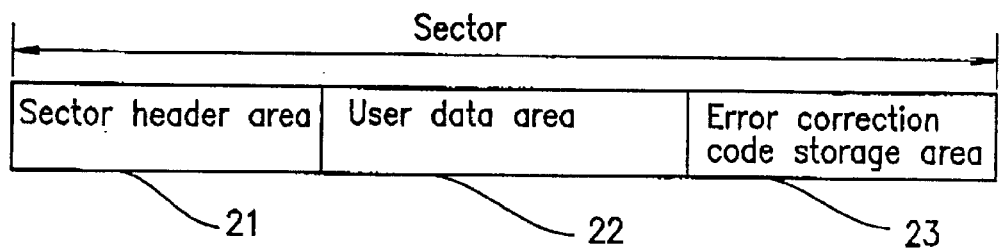
FIG. 2B is a diagram illustrating a sector structure of optical disk 100.

FIG. 2B shows an internal structure of the sector. The sector includes a sector header area 21, a user data area 22, and an error correction code storage area 23.

The sector header area 21 has a sector address for identifying the sector and an error detection code for the sector address stored therein. Based on the sector address, a disk reproduction apparatus determines from which sector among the plurality of sectors information should be read.

The user data area 22 can have 2 kbytes information stored therein.

In the error correction code storage area 23, an error correction code for the sector header area 21 and the user data area 22 included in the sector which includes the error correction code storage area 23 are stored. For reading data from the user data area 22, the disk reproduction apparatus performs error detection using the error correction code and performs error correction in accordance with the results of the error detection. Thus, data reading reliability is guaranteed.

(2) Logical Structure of the Optical Disk

Figure 3:
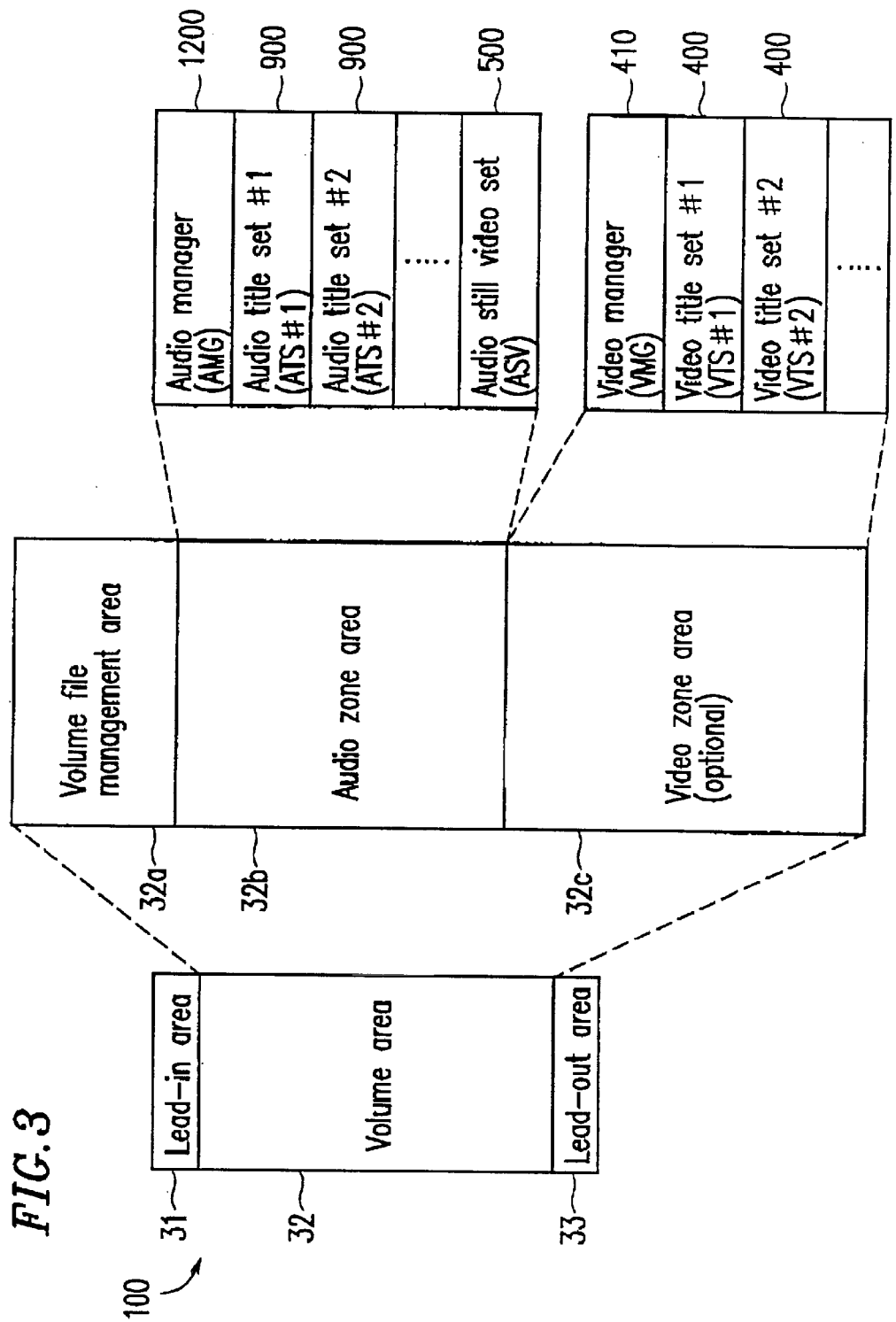
FIG. 3 is a diagram illustrating a logical structure of the optical disk 100.

FIG. 3 shows a logical structure of the optical disk 100. As shown in FIG. 3, the optical disk 100 includes a lead-in area 31, a volume area 32, and a lead-out area 33. These areas are located from an inner portion toward an outer periphery of the optical disk 100 in the order of the lead-in area 31, the volume area 32, and the lead-out area 33. These areas can be identified by identification information included in the sector addresses of physical sectors. The physical sectors are located in an increasing order of the sector addresses thereof.

The lead-in area 31 has data for stabilizing an operation of the disk reproduction apparatus at the start of reading, and the like, stored therein.

The lead-out area 33 does not have any meaningful data stored therein. The lead-out area 33 is used for notifying the disk reproduction apparatus of the termination of reproduction.

The volume area 32 has digital data corresponding to the application stored therein. The physical sectors included in the volume area 32 are managed as logical blocks. The logical blocks are respectively supplied with and identified with logical block numbers. The first physical sector in the volume area 32 is supplied with logical block number 0, and the physical sectors following the first physical sector are supplied with sequential logical block numbers after 0.

As shown in FIG. 3, the volume area 32 includes a volume file management area 32a, an audio zone area 32b, and a video zone area 32c. The volume file management area 32a and the audio zone area 32b are indispensable, but the video zone area 32c is optional. In other words, the video zone area 32a does not need to be existent.

In the volume file management area 32a, file system management information for managing a plurality of logical blocks as a file in accordance with ISO 13346 is stored.

The file system management information is information representing the correspondence between file names of a plurality of files and addresses of a plurality of logical blocks occupied by each file. The disk reproduction apparatus realizes access to the optical disk 100 on a file-by-file basis based on the file system management information. Specifically, the disk reproduction apparatus reference to the file system management information to obtain addresses of the logical blocks corresponding to a given file name, and accesses the logical blocks based on the obtained addresses. Thus, digital data of a desired file can be read.

The audio zone area 32b includes an audio manager (AMG: Audio Manager) 1200 and at least one audio title set (ATS: Audio Title Set) 900 stored therein. The audio zone area 32b can have an audio still video set (ASV: Audio Still Video Set) 500.

The audio title set 900 includes a plurality of pieces of audio data and management information for managing the reproduction order of the plurality of pieces of audio data. The audio title set 900 has a data structure for allowing audio data to be managed based on the unit referred to as an audio title. Typically, an audio title corresponds to a music album including one or more tunes.

The video zone area 32a includes a video manager (VMG: Video Manager) 410 and at least one video title set (VTS: Video Title Set) 400 stored therein.

The video title set 400 includes a plurality of pieces of video data and management information for managing the reproduction order of the plurality of pieces of video data. The video title set 400 has a data structure for allowing video data to be managed based on the unit referred to as a video title. Typically, a video title corresponds to a video clip album including one or more video clips.

(3) Video Zone Area 32c

The video zone area 32a includes the video manager 410 and at least one video title set 400.

(3.1) Video Title Set 400

Figure 4:
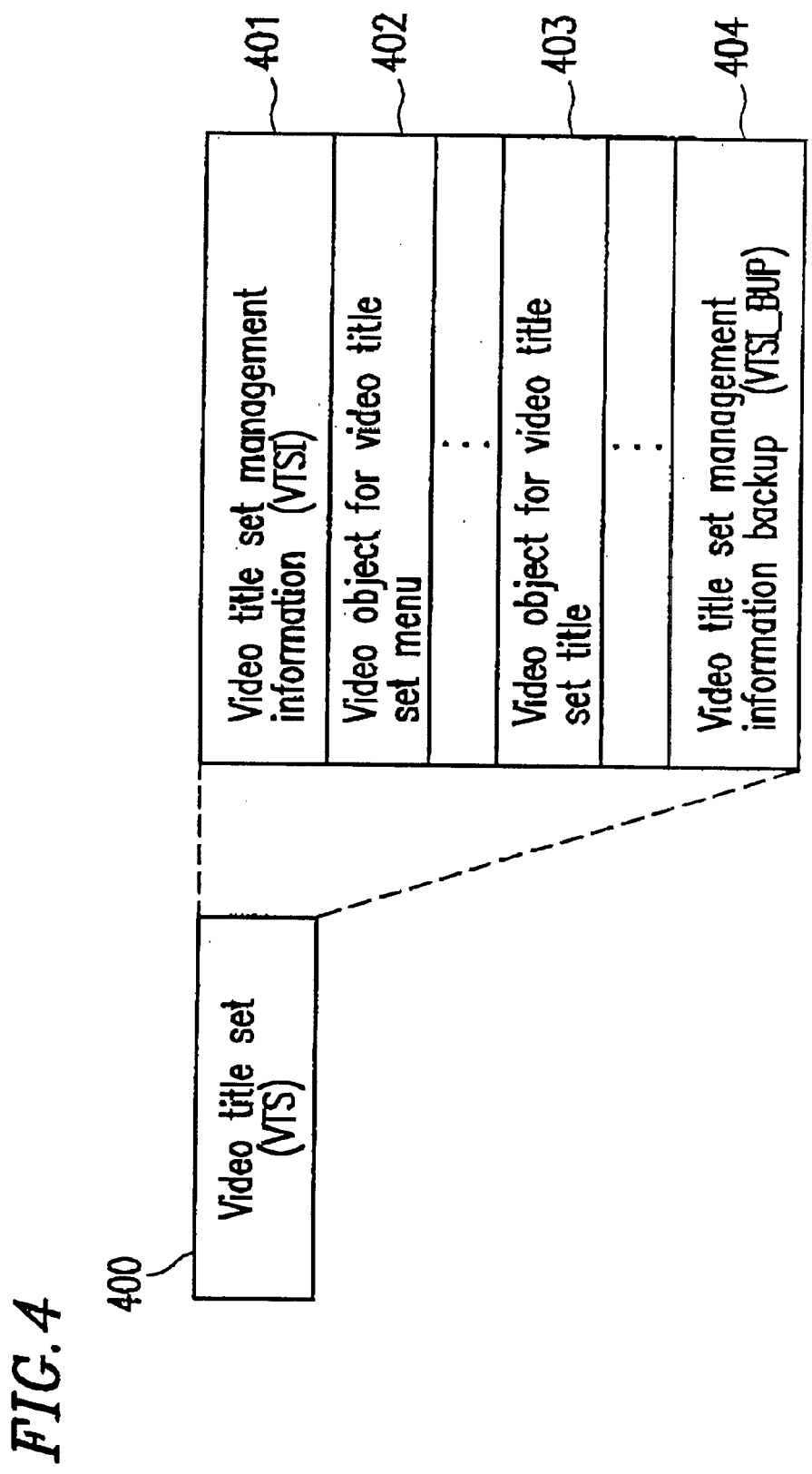
FIG. 4 is a diagram illustrating a data structure of a video title set 400.

FIG. 4 shows a data structure of the video title set 400. The video title set 400 includes a plurality of video objects for video title set menu (VTSM_VOB: Video Object for Video Title Set Menu) 402, a plurality of video objects for video title set title (VTSTT_VOB: Video Object for Video Title Set Title) 403, video title set management information (VTSI) 401 for managing the information such as reproduction control information of a plurality of Video objects, and video title set management information backup (VTSI_BUP) 404.

(3.1.1) Video Object for Video Title Set Title 403

The video object for video title set title 403 is packetized in units of 2 kbytes. The video object for video title net title 403 includes video data compressed by the MPEG1 format or the MPEG2 format. The video object for video title set title 403 can include a plurality of pieces of audio data in addition to the video data. In this case, the audio data can be encoded by the LPCM, AC3, MPEG-AUDIO or DTS format.

The video object for video title set title 403 includes a main video stream. The video object for video title set title 403 can include a plurality of sub video streams in addition to the main video stream. In this case, the sub video stream is obtained by connecting a plurality of pieces of run-length-compressed still picture data and control information into one piece of data. The sub video stream is used for displaying subtitles or for displaying a button on the video.

(3.1.2) Video Object for Video Title Set Menu 402

The video object for video title set menu 402 will not be described since it is irrelevant to the gist of the present invention. Hereinafter, the video object for video title set title 403 and the video object for video title set menu 402 may be referred to as "VOB".

(3.1.3) Video Title Set Management Information 401

The video title set management information 401 includes information (not shown) for managing the reproduction order of the video objects for video title set menu 402 and the video objects for video title set title 403, and reproduction control information (not shown).

The reproduction control information includes attribute information regarding each of video, audio and sub video. The attribute information regarding video includes, for example, information representing encoding format, aspect ratio, resolution and frame rate. The attribute information regarding audio includes, for example, information representing encoding format, quantization number, quantization frequency, and number of channels. The reproduction control information can include the number of audio streams and the number of sub video streams.

The video title set management information 401 can include various information other than the above-mentioned information. Such information will not be described herein since it is irrelevant to the gist of the present invention.

(3.2) Video Manager

The video manager will not be described herein since it is Irrelevant to the gist of the present invention.

The items which are not described in sections (3.1) and (3.2) are described in detail in "DVD-Specification for Read-Only Disc Part 3 Video Specifications". If necessary, refer to this document.

(4) Audio Zone Area 32b

The audio zone area 32b includes the audio manager 1200 and at least one audio title set 900. The audio zone area 32b can include the audio still video set 500.

(4.1) Audio Still Video Set 500

Figure 5:
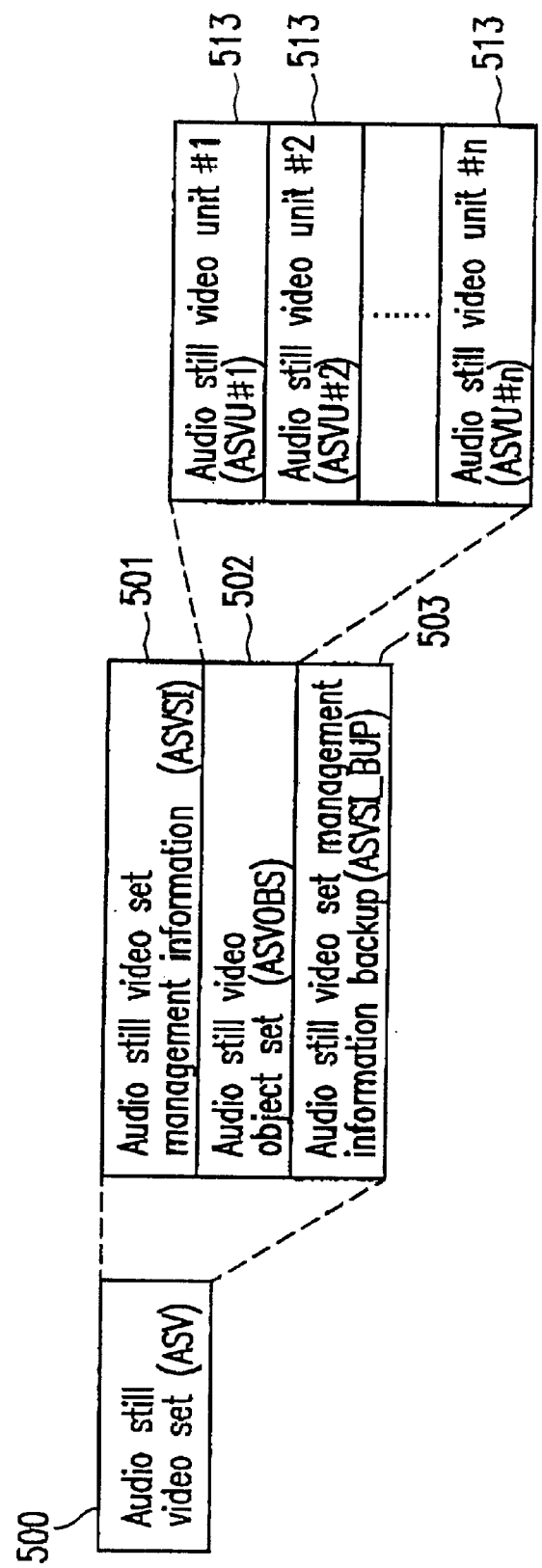
FIG. 5 is a diagram illustrating a data structure of an audio still video net 500.

FIG. 5 shows a data structure of the audio still video set 500. The audio still video set 500 includes audio still video set management information (ASVSI) 501, an audio still video object set (ASVOBS) 502, and audio still video set management information backup (ASVSI_BUP) 503.

The audio still video object set (ASVOBS) 502 includes a plurality of audio still video units (ASVU: Audio Still Video Unit) 513.

(4.1.1) Audio Still Video Unit 513

Figure 6A:
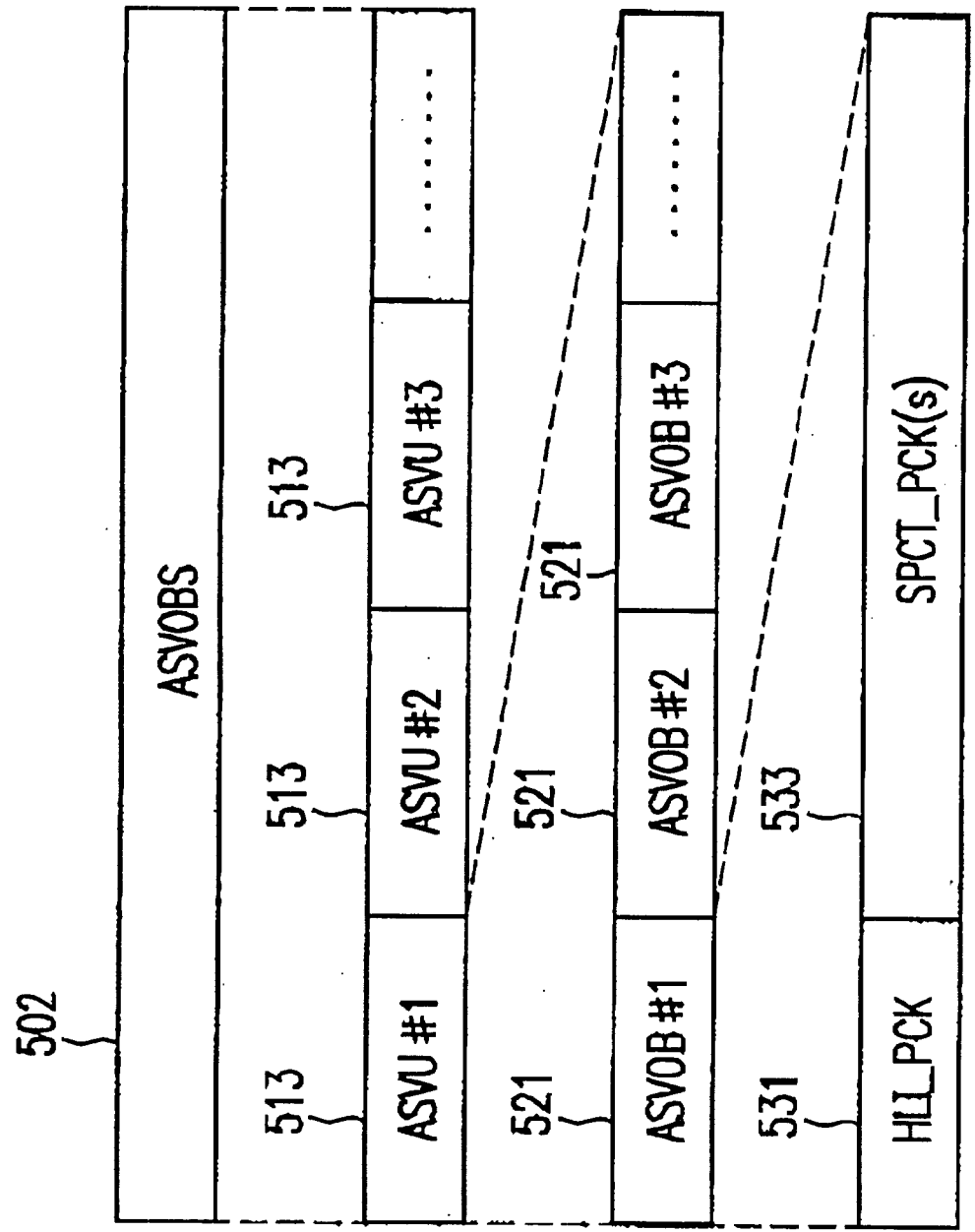
FIG. 6A is a diagram illustrating a data structure of an audio still video unit 513.

FIGS. 6A and 6B show a data structure of one audio still video unit 513. One audio still video unit 513 can include up to 99 audio still video objects (ASVOB: Audio Still Video Object) 521. It should be noted that the size of one audio still video unit 513 is limited to 2 Mbytes at the maximum.

The audio still video object 521 includes a highlight back (HLI_PCK) 531 and at least one still picture pack (SPCT_CK) 533. The audio still video object 521 can also include at least one sub video pack (SP_PCK) 532. The audio still video object 521 does not need to include any sub video pack 532.

FIG. 6A shows an exemplary data structure of the audio still video object 521 (ASVOB#1) not including any sub video pack; and FIG. 6B shows an exemplary data structure of the audio still video object 521 (ASVOB#1) including a sub video pack 532.

In the sub video pack 532, up to 3 sub video streams can be described. The sub video pack 532 has a code for identifying a sub video stream similarly to the case of the DVD-Video Standard.

In the still picture pack 533, only still picture data is recorded. Unlike the DVD-Video Standard, no moving picture is recorded in the still picture pack 533. One audio still video object 521 can include a plurality of still picture packs 533. In this case, the plurality of still picture packs 533 correspond to data for one still picture. Unlike the DVD-Video Standard, audio data cannot be recorded in the audio still video object 521.

Figure 7:
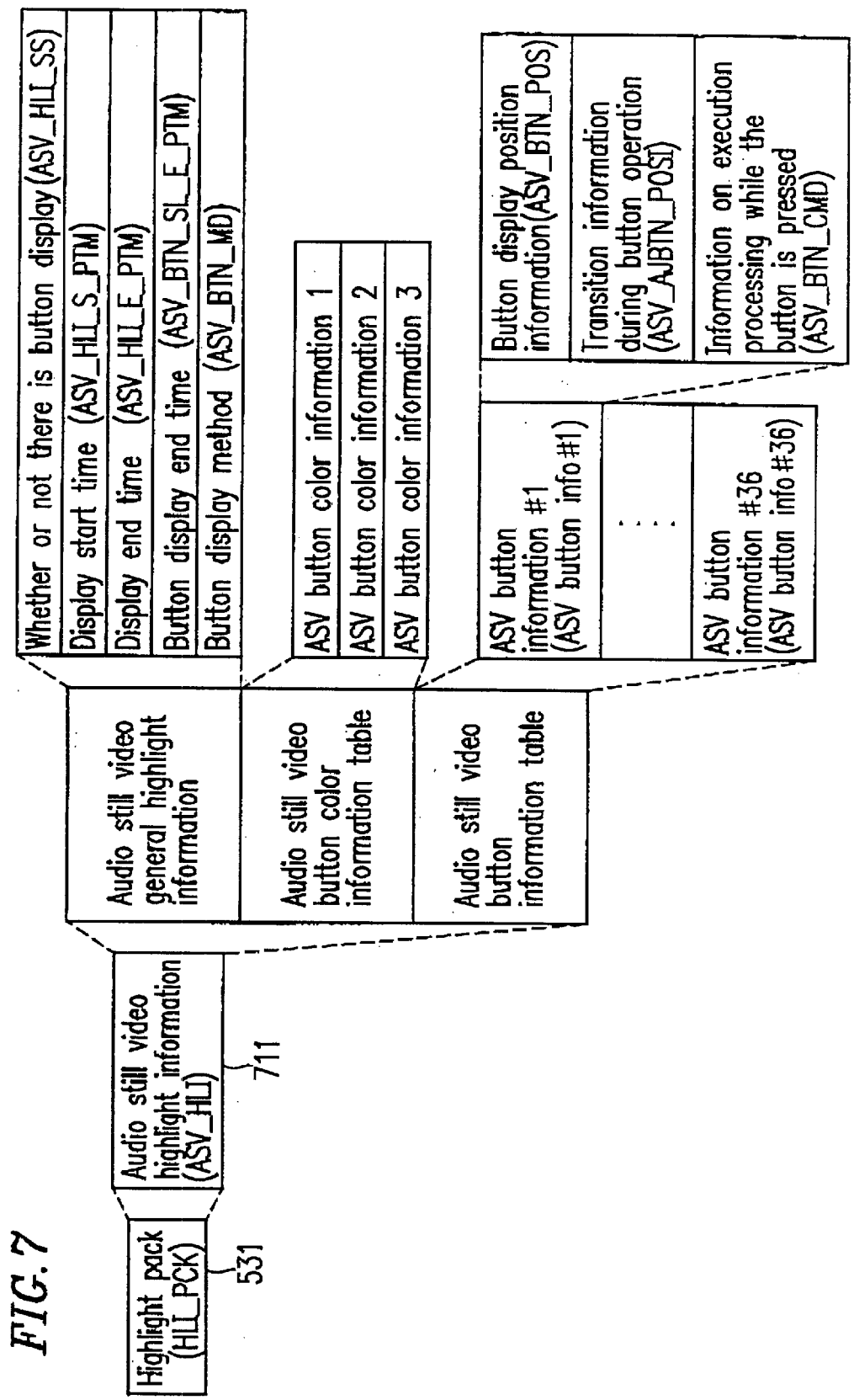
FIG. 7 is a diagram illustrating a data structure of a highlight pack 531.

FIG. 7 shows a data structure of the highlight pack 531.

The highlight pack 531 Includes audio still video highlight information (ASV_HLI; Audio Still Video Highlight Information) 711.

The audio still video highlight information 711 has the following information regarding the corresponding audio still video object 521 recorded therein: whether or not there is button display, display start time, display and time, button display and time, button display method, button color Information, button display position information, transition information during button operation, information on execution processing while the button is pressed, and the like.

(4.1.2) Audio Still Video Set Management Information 501

The audio still video set management information 501 includes reproduction control information and management information on the audio still video unit 513.

Figure 8:
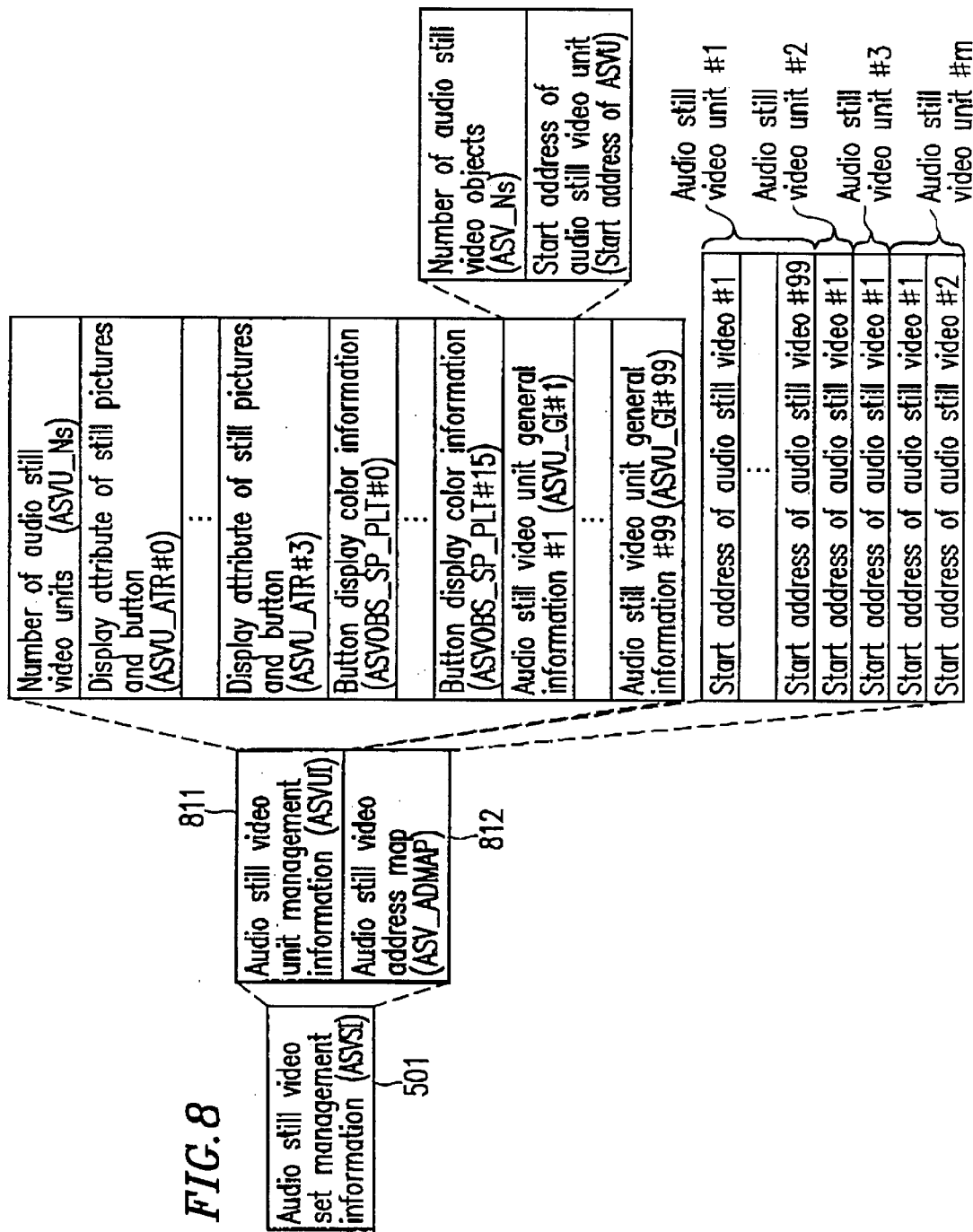
FIG. 8 is a diagram illustrating a data structure of an audio still video set management information 501.

FIG. 8 shows a data structure of the audio still video set management information 501. The audio still video set management information 501 includes audio still video unit management information (ASVUI: Audio Still Video Unit Information) 811 and an audio still video address map (ASV_ADMAP: Audio Still Video Address Map) 812.

The audio still video unit management information 811 includes the number of audio still video units 513 included in the audio still video set 500, display attribute of still pictures and the button, button display color information, and audio still video unit general information.

The audio still video unit general information includes the number of audio still video objects 521 included In the audio still video unit 513 and the start address of the audio still video unit 513.

The audio still video address map 812 includes address information on the audio still video objects 521 included in the audio still video unit 513.

(4.2) Audio Title Set 900

The audio title set 900 has one of two data structures selectively. That is, the audio title set 900 has one of two different data structures in accordance with whether the audio title set 900 includes an audio object (AOB: Audio Object) or not. Hereinafter, the audio object may be referred to as "AOB".

Figure 9A:
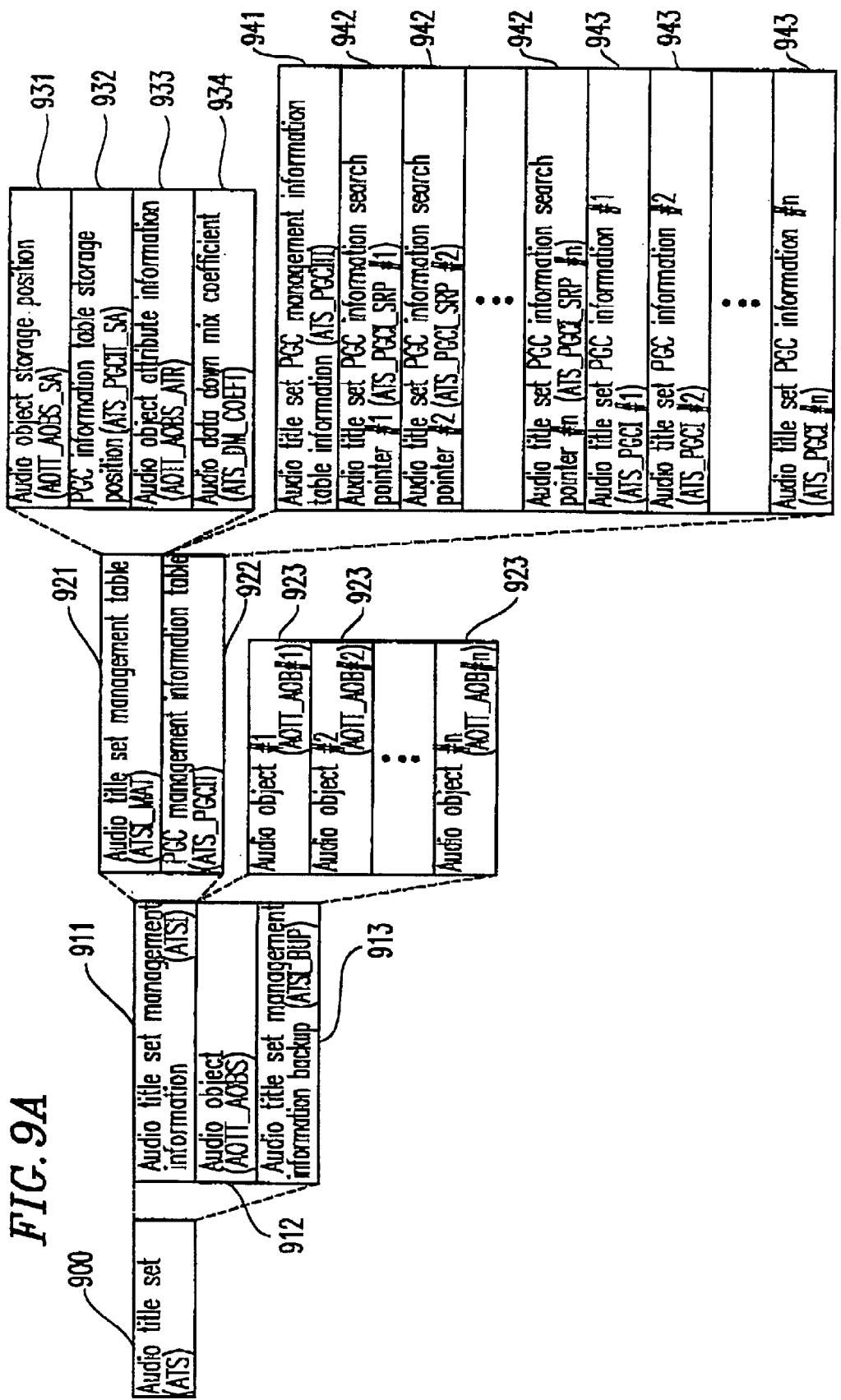
FIG. 9A is a diagram illustrating a data structure of an audio title set 900.

FIG. 9A shows a data structure of the audio title set 900 when including audio objects.

As shown in FIG. 9A, the audio title set 900 Includes a plurality of audio objects 923, audio title set management information (ATSI) 911 for managing reproduction order information and the reproduction control information of the plurality of audio objects 923, and audio title set management information backup (ATSI_BUP) 913.

Figure 9B:
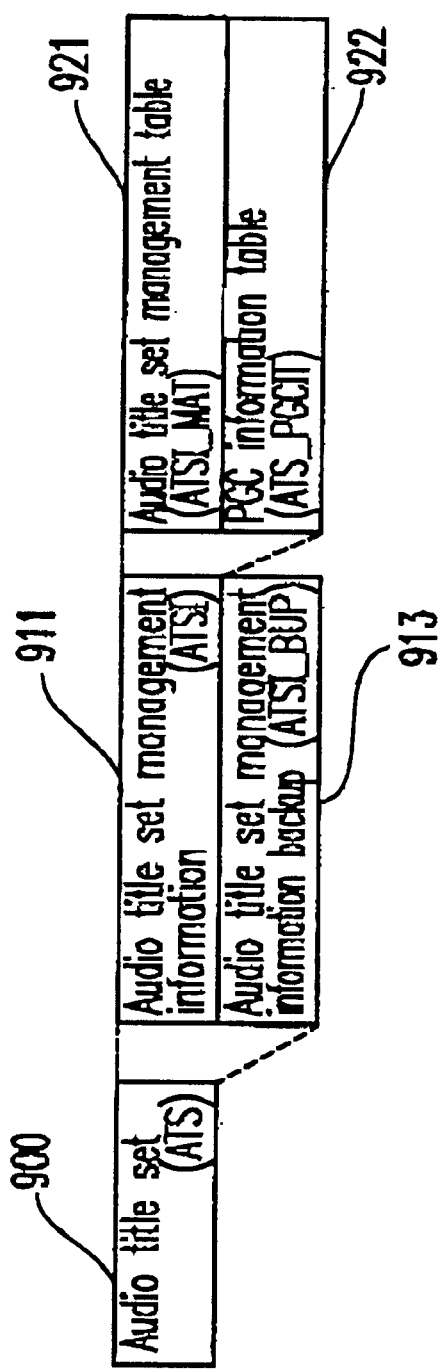
FIG. 9B is a diagram illustrating a data structure of the audio title set 900.

FIG. 9B shows a data structure of the audio title set 900 when not including any audio object.

AS shown in FIG. 9B, the audio title set 900 does not include any audio object 923. In this case, the video object for video title set title 403 is reproduced instead of the audio object 923. Such reproduction is performed by causing the audio title set 900 to refer to the video objects for video title set title 403 included in the video title set 400.

As shown in FIG. 9B, the audio title set 900 includes audio title set management information 911 for managing reproduction order information and reproduction control information of the plurality of video objects for video title set title 403, and the audio title set management information backup 913.

(4.2.1) Audio Object 923

Each audio object 923 is packetized in units of 2 kbytes. The audio object 923 includes audio data encoded by the LPCM format, packetized PCM format (which is a lose-less compression format), AC3 format, DTS format, or the like. The audio object 923 can include real-time text data in addition to the audio data. The real-time text data is considered to be used for displaying lyrics or the like.

(4.2.2) Audio Title Set Management Information 911 (when the Audio Title Set 900 includes an Audio Object 923)

The audio title set management information 911 includes reproduction order management information and reproduction control information on the plurality of audio objects 923. The reproduction order of the plurality of audio objects 923 is designated by a program chain (PGC) similarly to the case of the DVD-Video Standard.

As shown in FIG. 9A, the audio title set management information 911 includes an audio title set management table (ATSI_MAT) 921 and a PGC management information table (ATS_PGCIT) 922.

The audio title set management table 921 is header information of the audio title set management information 911. The audio title set management table 921 includes an audio object storage position 931, a PGC management information table storage position 932, audio object attribute information 933, an audio data down mix coefficient 934 and the like.

The PGC management information table 922 includes audio title set PGC management information table information (ATS_PGCITI) 941, and a plurality of audio title set PGC information search pointers (ATS_PGCI_SRP) 942, and a plurality of pieces of audio title set PGC information (ATS_PGCI) 943. Hereinafter, the audio title set PGC information 943 may be referred to as "PGC information 943".

The audio title set PGC management information table information 941 is header information of the PGC management information table 922. In the audio title set PGC management information table information 941, the number of the audio title set PGC information search pointers 942 stored in the PGC management information table 922 and the like are stored.

Each audio title net PGC information search pointer 942 is index information of a plurality of program chains stored in the PGC management information table 922. The audio title set PGC information search pointer 942 is used for designating PGC information which is first executed for each title.

In each piece of the PGC information 943, the recording position of at least one audio object 923 on the optical disk 100 and the reproduction order thereof are described. Reproduction of identical audio objects 923 can be described in different pieces of PGC information 943.

FIG. 10 shows a data structure of one piece of PGC information 943. The PGC information 943 includes audio title set PGC general information (ATS_PGC_GI) 1011, an audio title set program information table (ATS_PG_IT) 1012, an audio title set cell reproduction information table (ATS_C_PBIT) 1013, and an audio title set audio still video reproduction information table (ATS_ASV_PBIT) 1014.

The audio title set PGC general information 1011 includes an audio title set program number 1031 (which shows the number of programs included in one audio title), an audio title set call number 1032 (which shows the number of cells included in one audio title), PGC reproduction time period 1022, address information 1023 on the audio title set program information table 1012, address information 1024 on the audio title set cell reproduction information table 1013, and address information 1025 on the audio title set audio still video reproduction information table 1014.

Hereinafter, the "program" refers to an audio program included in an audio title. For example, when the audio title corresponds to a music album, a "program" corresponds to a tune included in the music album.

In the audio title set program information table 1012, a plurality of pieces of audio title set program information (ATS_PGI) 1026 are described. The audio title set program information (ATS_PGI) 1026 represents information on programs included in one audio title.

In each of the plurality of pieces of audio title set program information 1026, the following information is described: audio program physical allocation information 1041 (which shows whether or not an AOB corresponding to the present audio program and an AOB corresponding to the immediately previous audio program are recorded at physically continuous positions on the optical disk 100), audio program time attribute information 1042 (which shows whether or not the time information on the AOB corresponding to the present audio program and the time information on the AOB corresponding to the immediately previous audio program are continuous to each other), an audio program start cell number 1043 (which shows the first cell number included in the audio program), reproduction start audio cell time 1044 (which shows reproduction start time of the first audio cell included in the audio program), audio program total reproduction time period 1045 (which shows the total reproduction time period of the audio program), audio pause time period 1046 (which shows the silent time period before there production of the first audio cell included in the audio program is started), and the like.

In the audio title set cell reproduction information table 1013, a plurality of pieces of audio title set cell reproduction information (ATS_C_PGI) 1027 are described. Each piece of audio title set cell reproduction information 1027 represents information on the cell corresponding to is the AOB to be reproduced.

In each pleas of the plurality of pieces of audio title set call reproduction information 1027, the following information is described, a cell index number 1051 showing the order of the cells included in the audio program, a cell type 1052 showing the type of the cell, a cell start address 1053 showing the start address of the call, a call and address 1054 showing the end address of the cell, and the like.

The cell type 1052 shows, for example, whether the cell is a silent call or an audio cell. The call start address 1053 and the cell end address 1054 are described with, for example, the relative address with respect to the first pack of the first AOB included in the audio title set 900.

The audio title set audio still video reproduction information table 1014 includes a plurality of audio title set audio still video reproduction information search pointers (ATS_PG_ASV_PBI_SRP) 1028 and a plurality of pieces of audio title set audio still video reproduction information (ATS_ASV_PBI) 1029.

Each audio title set audio still video reproduction information search pointer 1028 corresponds to each program included in one audio title net. Accordingly, the number of the audio title set audio still video reproduction information search pointers 1028 is equal to the number of pieces of the audio title set program information 1026.

In each audio title set audio still video reproduction information search pointer 1028, the following information is described: an audio still video unit number (ASVUN) 1061 (which shows the audio still video unit 513 used for program reproduction), an audio still video reproduction made (ASV_DMOD) 1062, and a start address 1063 and an end address 1064 of the audio still video reproduction information (ATS_ASV_PBI) 1029 used for program reproduction.

As the audio still video unit number 1061, the number in conformity to the recording order of the audio still video units 513 stored in the audio still video set 500 is described. By this number, the audio still video unit 513 used for program (PG) reproduction is specified.

The audio still video reproduction mode 1062 includes a display timing mode and a display order mode. As the display timing mode, "slide show mode" or "browsable mode" can be designated; and as the display order mode, "sequential mode", "random mode" or "shuffle mode" can be designated.

Each piece of audio title set audio still video reproduction information 1029 includes a plurality of audio still video display lists (ASV_DLIST) 1071. As the data structure of the audio still video display list 1071, four different data structures usable in accordance with the audio still video reproduction mode 1062 are defined. Two data structures are defined for the display timing mode, one for the "slide show mode" and one of the "browsable mode". Two data structures are defined for the display order mode, one for the "sequential mode" and one for "random mode" or "shuffle mode". Thus, four (2×2) data structures are defined. Hereinafter, the four data structures will be described one by one.

FIG. 11A shows a data structure of the audio still video display list 3071 when the display timing mode is the "slide show mode" and the display order mode :Lo the "sequential mode".

In the audio still video display list 1071, the following information is described: an ASV number (ASV Number) 1101, a specified video stream existence flag (Entry DLIST Flag) 1102, a forcedly selected button number (FOSL_BTNN: Forcedly Selected Button Number) 1103, a program number (Program Number) 1104, display timing information (Display Timing) 1105, a start effect mode (Start effect mode) 1106, an end effect mode (End effect mode) 1107, a start effect period (Start effect period) 1108, and an end effect period (End effect period) 1109.

The ASV number 1101 is information for designating the audio still video object 521 to be displayed among at least one audio still video object 521 included in the audio still video unit 513.

The specified video stream existence flag 1102 has value "1" or "0". The value "1" of the specified video stream existence flag 1102 indicates that the audio still video reproduced in accordance with the audio still video reproduction information 1029 including the specified video stream existence flag 1102 is the specified video stream to be used for the menu. The value "0" of the specified video stream existence flag 1102 indicates that the audio still video reproduced in accordance with the audio still video reproduction information 1029 including the specified video stream existence flag 1102 is a video stream other than the specified video stream to be used for the menu.

Within one program (PG), only two states are permitted: in one state, one of a plurality of specified video stream existence flags 1102 has the value "1" and the other flags have the value "0"; in the other state, all the plurality of specified video stream existence flags 1102 have the value "0". Existence of a specified video stream existence flag 1102 having the value "1" in the program (PG) indicates that a specified video stream to be used for the menu exists in the program. Non-existence of a specified video stream existence flag 1102 having the value "1" in the program (PG) (i.e., all the specified video stream existence flags 1102 in the program (PG) have the value "0") indicates that there is no specified video stream to be used for the menu in the program.

The forcedly selective button number 1103 indicates the button number selected as default when the still picture designated by the ASV number 1101 is displayed.

The program number 1104 and the display timing information 1105 are information for designating the timing to start the display of the still picture designated by the ASV number 1101. In other words, when the reproduction of the program designated by the program number 1104 reaches a display time designated by the display timing information 1105 the display of the still picture and the button is started in accordance with the display list 1071.

The start effect mode 1106 and the end effect mode 1107 are information for designating display effects provided when a still picture is switched to another still picture. For example, display effects such as "fade", "cut", "dissolved and "wipe" can be designated by the start effect mode 1106 and the end effect mode 1107.

The start effect period 1108 and the end effect period 1109 are information indicating the time period in which the display effect designated by the start effect mode 1106 and the end effect mode 1107 is maintained.

FIG. 11B shows a data structure of the audio still video display list 1071 when the display timing mode is the "slide show mode" and the display order mode is the "random mode" or the "shuffle mode".

The data structure shown in FIG. 11B is identical with the data structure shown in FIG. 11A except that the ASV number 1101 in FIG. 11A is replaced with a reserved (Reserved) area in FIG. 11B.

In the display list 1071 in FIG. 113, the ASV number 1101 does not need to be designated. The reason is that although the timing to switch one still picture to another is designated by the program number 1104 and the display timing information 1105, the next still picture to be displayed is determined randomly.

In the "random mode", the audio still video object to be displayed next is determined completely randomly among the audio still video unit. In the "shuffle mode", the audio still video object is determined randomly, but the audio still video object once selected is not selected again until all the other audio still video objects have been selected.

The contents in the reserved area is not specified. The reserved area is, for example, blank.

Figure 11C:
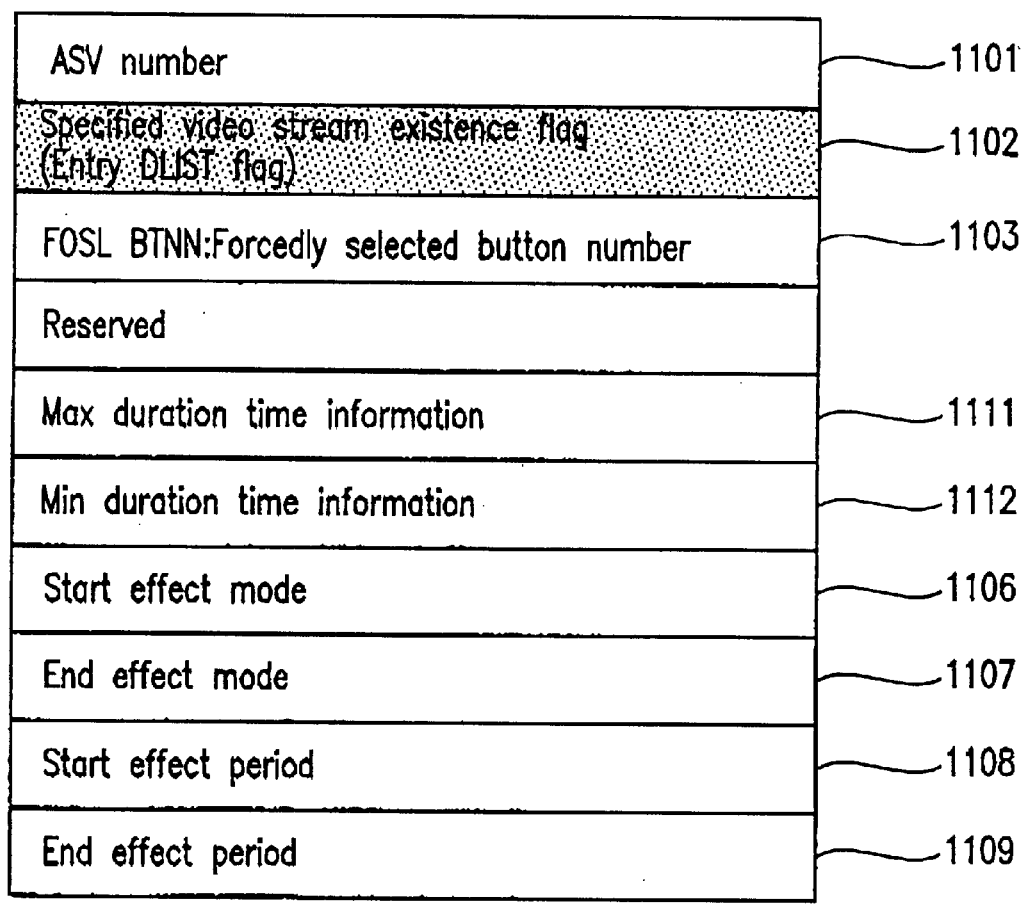
FIG. 11C is a diagram illustrating a data structure of the audio still video display list 1071.

FIG. 11C shows a data structure of the audio still video display list 1071 when the display timing mode is browsable modes and the display order mode is "sequential mode".

The data structure shown in FIG. 11C is identical with the data structure shown in FIG. 11A except that the program number 1104 in FIG. 1A is replaced with a reserved (Reserved) area in FIG. 11C and that the display timing information 1105 in FIG. 11A is replaced with a maximum display duration time period (Max duration time) 1111 and a minimum display duration time period (Min duration time) 1112 in FIG. 11C.

In the display list 1071 in FIG. 11C, neither the program number 1104 nor the display timing information 1105 need to be designated. The reason is that in the "browsable mode", one still picture is switched to another still picture in response to the input from the user at arbitrary timing. Thus, the viewer is allowed to change pages freely.

The maximum display duration time period 1111 is used for automatically executing page forwarding even when there is no input from the user. When there is no input from the user even after the time period designated by the maximum display duration time period 1111 passes, the still picture is automatically switched to the next still picture.

The minimum display duration time 1112 is used for displaying the still picture designated by the ASV number 1101 for at least a minimum duration. Until the time period designated by the minimum display duration time 1112 passes, the still picture is not switched to the next still picture even if there is an input from the user.

Figure 11D:
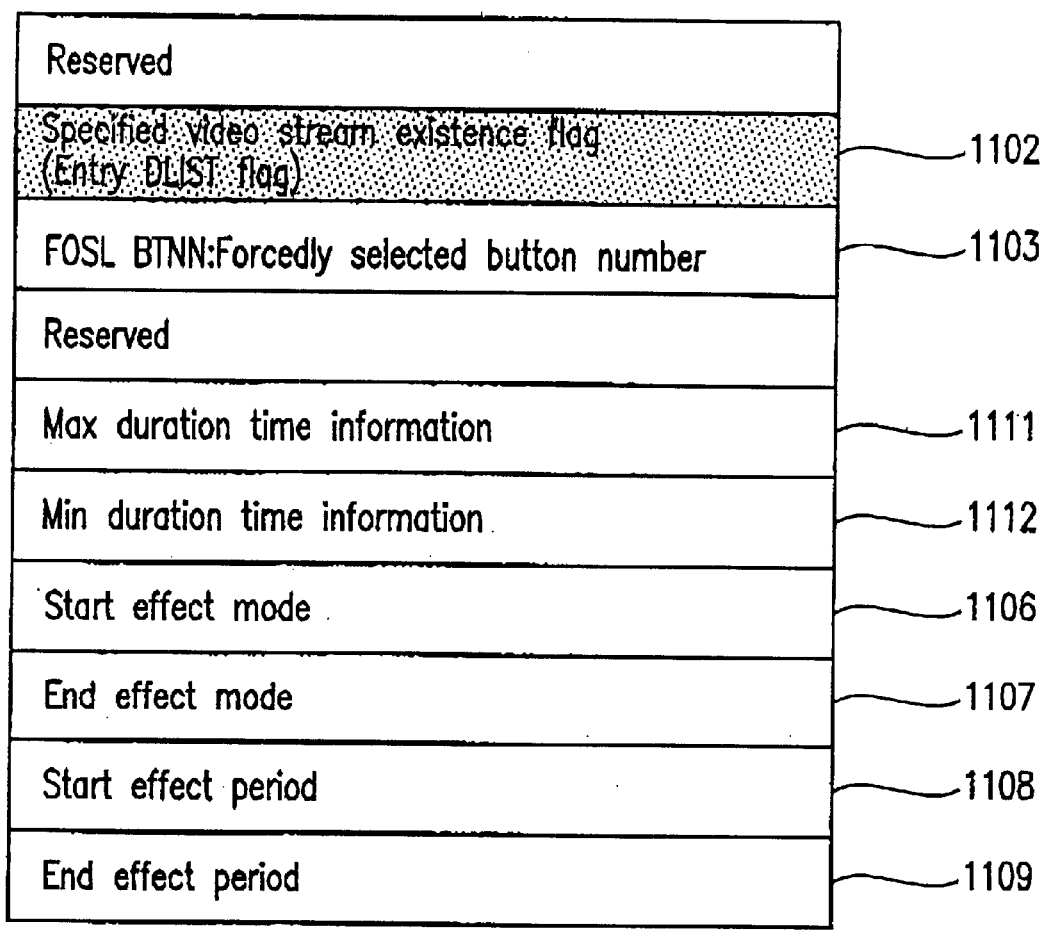
FIG. 11D is a diagram illustrating a data structure of the audio still video display list 1071.

FIG. 11D shows a data structure of the audio still video display list 1071 when the display timing mode is the "browsable mode" and the display order mode is the "random mode" or the "shuffle mode".

(4.2.3) Audio Title Set Management Information 911 (when the Audio Title Set 900 does not include an Audio Object 923)

Referring again to FIG. 9B, the audio title act 900 refers to the video objects for video title set title included in another video title set. As a result, a video object for video title set title is reproduced instead of the audio object. In this case, the basic structure that the audio title set management information 911 includes the audio title set management table 921 and the PGC management information table 922 is maintained.

The audio title set management table 921 and the PGC management information table 922 are different in this case from the case where the audio title set 900 includes the audio object 923 in the following points.

In the audio title set management table 921, address information on the video title set including the video object referred to and the storage position of the video object in the video title set are described instead of the audio object storage position 931.

The PGC management information table 922 does not include the audio title set audio still video reproduction information table. The reason is that it is not necessary to refer to the audio still video since the video object already includes video information.

(4.3) Audio Manager 1200

FIG. 12 shows a data structure of the audio manager 1200. The audio manager 1200 is information for reproduction control which the disk reproduction apparatus first refers to for reproducing the optical disk 100 with priority being put on audio information.

The audio manager 1200 includes audio manager information (AMGI) 1211, an audio manager menu VOB (AMGM_VOBS) 1212, and audio manager information backup (AMGI_BUP) 1213.

The audio manager information 1211 includes an audio manager information management table (AMGI_MAT) 1221 including attribute information and pointer information, audio title management information 1222 including the number of audio titles and the like, a plurality of audio title search pointers (ATT_SRP) 1223 each including audio title search information, and an audio manager menu PGC management information table (AMGM_PGCI_UT) 1224 including PGC information for an audio manager menu.

The audio manager information management table 1221 includes an AMG Identifier (AMG_ID) for identifying the audio manager 1200, an AMG end address (AMG_EA) which is an end address for table management, an AMGI end address (AMGI_EA), a version number (VERN), a volume set identifier (VLMS_ID), a title net number (TS_Ns) showing the number of title sets included in the volume, a provider identifier (PVR_ID) for identifying the provider which created the disk an AMGI_MAT end address (AMGI_MAT_EA), an automatic execution flag (Auto_Play_Flag) for defining the operation of the reproduction apparatus when the disk is inserted, and ASVS start address (ASVS_SA) for recording the position of the audio still picture set, address information on tables for AMG and AMGI, and AMGM_VOBS attribute information including VOB attribute information included in the audio manager.

Although not shown in FIG. 12, each audio title search pointer table (ATT_SRP) 1223 includes "audio title type" indicating the type of each title, "in-title program number" indicating the number of programs included in the title, "title reproduction time period" indicating the reproduction time period of the title, "audio title set number" indicating the audio title set number to which each title belongs, "ATS title number" indicating the title number of each title in the audio title set, and "ATS address" indicating the address of the audio title set to which each title belongs.

Figure 13:
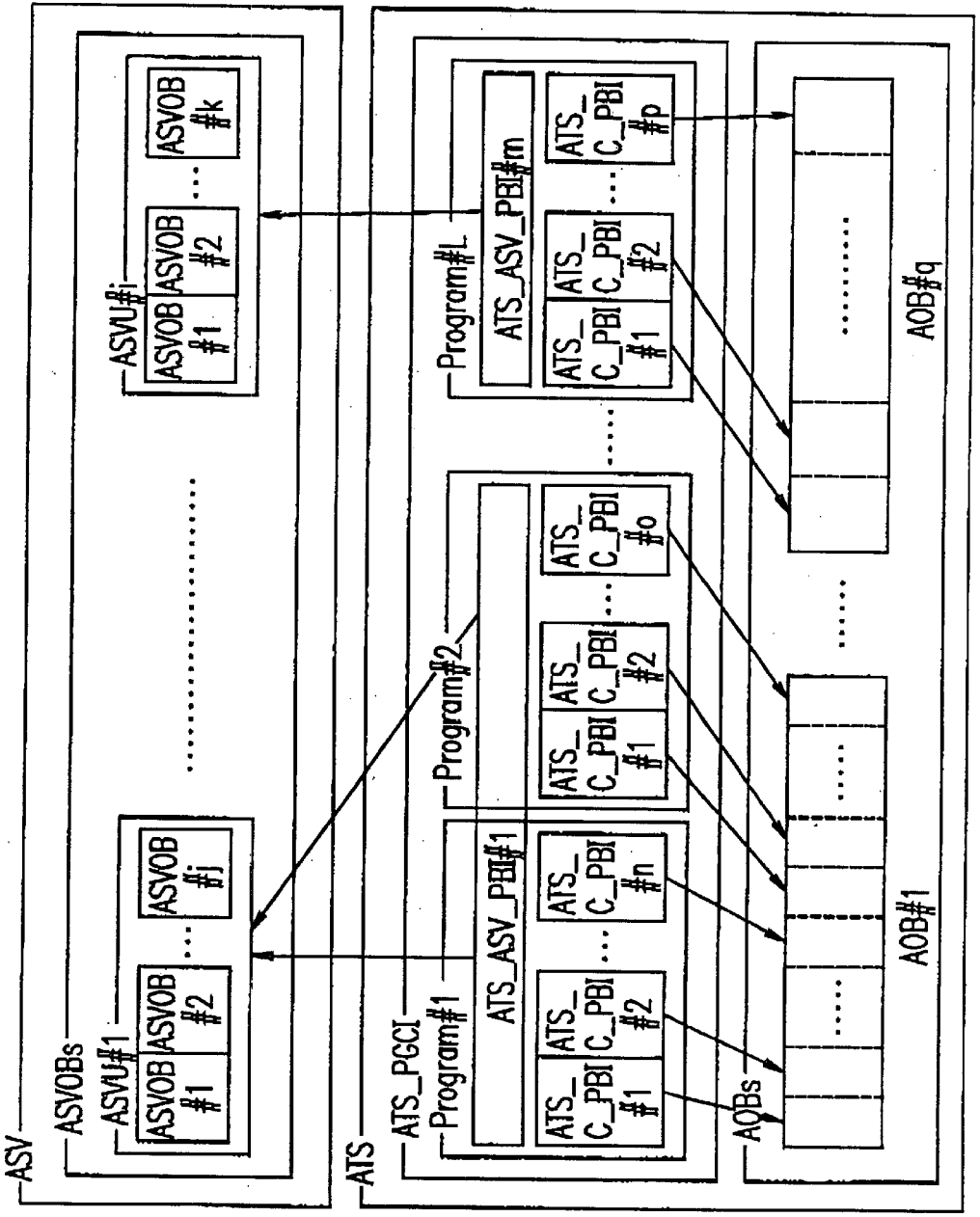
FIG. 13 is a diagram schematically illustrating the correspondence between ASVs and ATSs stored in the optical disk 100.

FIG. 13 schematically shows the correspondence between the ASV and ATS stored in the optical disk 100.

The ATS can include a plurality of pieces of PGC information (ATS_PGCI). However, in the example shown in FIG. 13, the ATS includes one piece of PGC information (ATS_PGCI) .

In the PGC information, the reproduction order of audio programs in an audio program group (Program #1, Program #2, . . . Program #L) is described. Each audio program is an access unit of audio data. Each audio program includes a plurality of pieces of audio cell reproduction information (ATS_C_PBI). The audio cell reproduction information is a minimum management unit. The audio cell reproduction information points to an AOB including actual audio data. Thus, the audio data to be reproduced corresponding to the audio program is determined.

In the PGC information, audio still video reproduction information (ATS_ASV_PBI) indicating how the still picture should be reproduced is described on a program-by-program basis. A plurality of audio programs can share the same audio still video reproduction information. In the example shown in FIG. 13, Program #1 and Program #2 share ATS_ASV_PBI#1. The reason for this is that the audio still video reproduction information table (ATS_ASV_PBIT) is structured so that ATS_PG_ASV_PBI_SRP corresponding to the audio program can point to one of the plurality of pieces of ATS_ASV_PBI.

The PGC information designates an ASVU included in the ASV in order to display a plurality of still pictures in relation to the reproduction of the audio program.

The ASVU is also a unit used by the reproduction apparatus for buffering still picture data. More specifically, before reproducing one audio program, the reproduction apparatus reads a still picture data group in the designated ASVU from the optical disk 100. Accordingly, the reproduction apparatus does not need to read the still picture data group from the optical disk 100 during the reproduction of the audio program (for example, music program).

Before reproducing the next audio program, the reproduction apparatus determines whether or not the still picture data group in the ASVU required for the next audio program exists in a main memory of the reproduction apparatus. When the still picture data group in the ASVU required for the next audio program exists in the main memory of the reproduction apparatus, the reproduction apparatus does not need to newly read the still picture data group from the optical disk 100.

When the audio title producer desires to quickly switch one audio program to the next audio program, the PGC information can be structured so that an audio program and the next audio program share one ASVU. By structuring the PGC information in this manner, the reproduction apparatus does not need to buffer the still picture data group in the ASVU retried for the next audio program. As a result, the reproduction apparatus can quickly switch two audio programs reproduced continuously.

The ATS_ASV_PBI manages the order of still pictures to be displayed in the form of a display list (ASV_DLIST). In the display list (ASV_DLIST), the still picture in the ASVU to be displayed is designated by the ASV number.

As described above, the PGC information allows different still pictures to be displayed for different audio programs. The PGC information also allows the same still picture to be displayed for a plurality of audio programs. When one audio program is switched to another audio program, the still pictures to be displayed can be switched with no need for muting.

Figure 14:
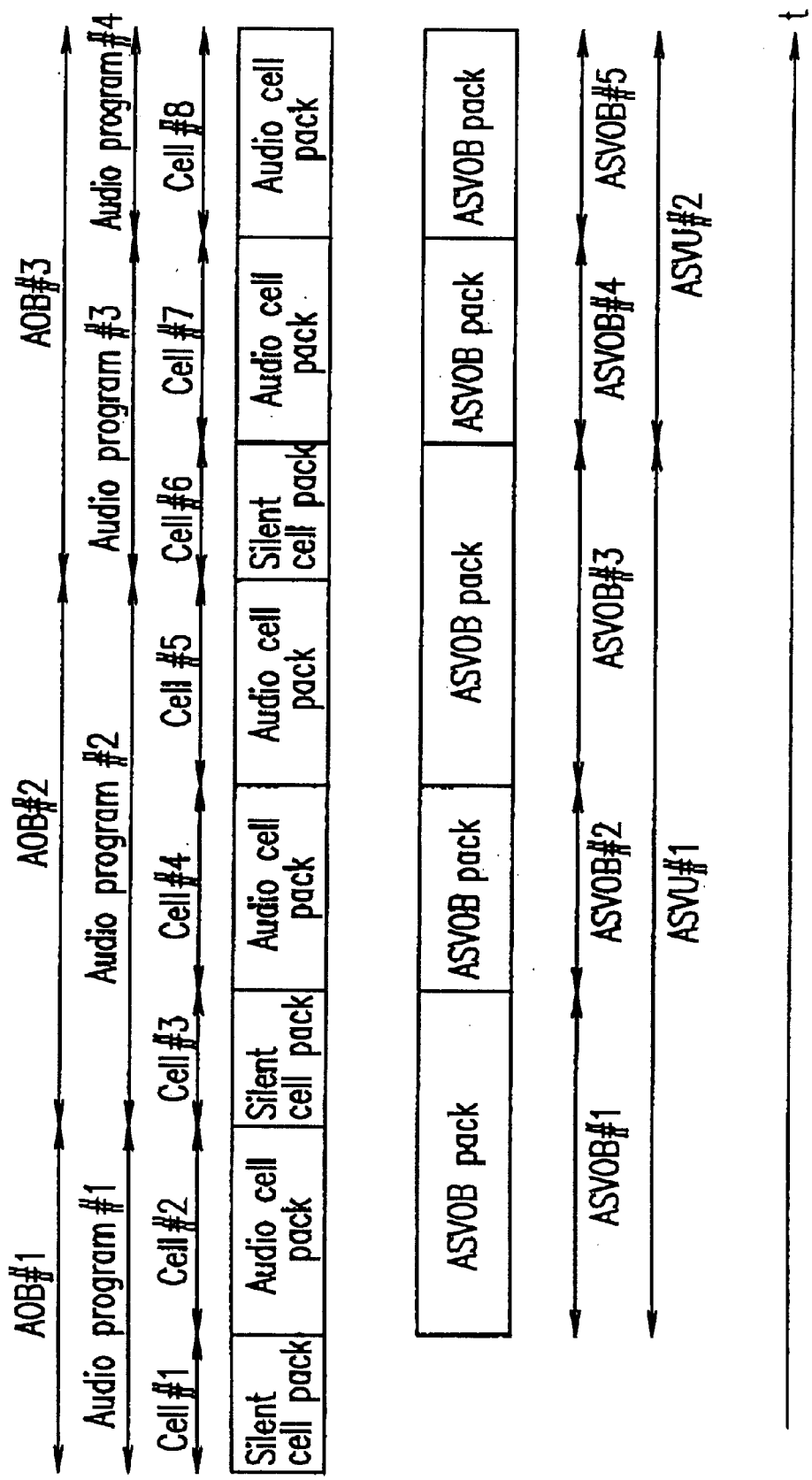
FIG. 14 is a diagram schematically illustrating the correspondence among audio programs, AOBs, calls, ASVUs and ASVOBs stored in the optical disk 100.

FIG. 14 schematically shows the correspondence among the audio programs, AOBs, cells, ASVUs and ASVOBs stored on the optical disk 100. Such a correspondence is defined by the PGC information (ATS_PGCI). In FIG. 14, arrow t represents the time axis.

In the example shown in FIG. 14, one audio title includes four audio programs. Audio program #1 corresponds to AOB#1, audio program #2 corresponds to AOB#2, and audio programs #3 and #4 correspond to AOB#3. Herein, the AOBs are recorded on the optical disk 100 in the order of AOB#1, AOB#2 and then AOB#3.

Audio program #1 includes cells #1 and #2; audio program #2 includes cells #3, #4 and #5; audio program #3 includes cells #6 and #7; and audio program #4 includes cell #8. Cells #1, #3 and #6 are silent calls, and cells #2, #4, #5, #7 and #8 are audio calls.

Audio programs #1 and #2 correspond to ASVU #1, and audio programs #3 and #4 correspond to ASVU #2. The display of ASVOB#1 is started in synchronization with the reproduction start of cell #2; the display of ASVOB#2 is started in synchronization with the reproduction start of cell #4; the display of ASVOB#3 is started in synchronization with the reproduction start of cell #5; and the display of ASVOB#4 is started in synchronization with the reproduction start of cell #7; and display of ASVOB#5 is started in synchronization with the reproduction start of cell #8.

FIG. 15 shows exemplary contents of the program information 1026 and contents of the audio still video reproduction information search pointer 1028 regarding each of audio programs #1 through #4. In the example shown in FIG. 15, it is assumed that the reproduction time period of each and every audio cell is 60 seconds (5,400,000 in PTS (Presentation Time Stamp)) and that the reproduction time period of each and every silent cell is 1 second (90,000 in PTS).

FIG. 16A shows exemplary contents of the audio still video reproduction information 1029 (ATS_ASV_PBI#1) corresponding to audio programs #1 and #2 shown in FIG. 14.

FIG. 16B shows exemplary contents of the audio still video reproduction information 1029 (ATS_ASV_PBI#2) corresponding to audio programs #3 and #4 shown in FIG. 14.

FIG. 17 shows exemplary contents of the cell reproduction information 1027 regarding each of calls #1 through #8 shown in FIG. 14. In the example shown in FIG. 17, it is assumed that the audio data is encoded at a sampling rate of 48 kHz and 16 bits, and 2ch. In this case, the number of packs of the silent cells is 96 and the number of packs of the audio cells is 5760.

FIG. 18 shows exemplary contents of ATS_PG_ASV_PBI#1 through #5. In the example shown in FIG. 18, it is assumed that the number of still picture packs is 50.

FIG. 19 shows exemplary contents of audio still video unit general information (ASVU_GI)).

The addresses 1063 and 1064 (FIG. 15) of the audio still video reproduction information included in the audio still video reproduction information search pointer 1028 can be represented by, for example, a relative address using the position at which the first ASVOB is recorded as a reference address. However, so long as the position of the ASVOB on the optical disk 100 can be specified, addresses 1063 and 1064 can be each represented by an arbitrary address. For example, when the audio still video unit general information (ASVU_GI) includes address information usable as the reference address, the addresses 1063 and 1064 can be represented by relative addresses with respect to that reference address.

In the example shown in FIG. 15, the ASV reproduction mode 1062 of audio programs #1 and #2 is "slide show". In this case, the still picture is reproduced in synchronization with audio information. Since the ASVU number 1061 of audio programs #1 and #2 is "1", ASVU#1 is read to the buffer of the reproduction apparatus before the reproduction of audio programs #1 and #2. Next, ATS_ASV_PBI#1 is referred to based on the addresses 1063 and 1064 of ATS_ASV_PBI. As a result, the display of still pictures corresponding to display lists #1, #2 and #3 of the ATS_ASV_

PBI#1 shown in FIG. 16A is started at the display timing designated by the program number 1103 and the display timing information 1105. The display timing is in synchronization with the reproduction time of audio information to be reproduced together with the still pictures.

In other words, the display of the still picture designated by display list #1 of ATS_ASV_PBI#1 is started when PTS becomes 90,000 during the reproduction of AOB#1. The display of the still picture designated by display list #2 of ATS_ASV_PBI#1 is started when PTS becomes 90,000 during the reproduction of AOB#2. The display of the still picture designated by display list #3 of ATS_ASV_PBI#1 is started when PTS becomes 5,580,000 during the reproduction of AOB#2.

When the ASV reproduction mode 1062 is "slide show", the display of the still picture is displayed at the timing predetermined in synchronization with the audio reproduction time as described above. The still picture cannot be updated by the user's instruction.

Figure 20A:
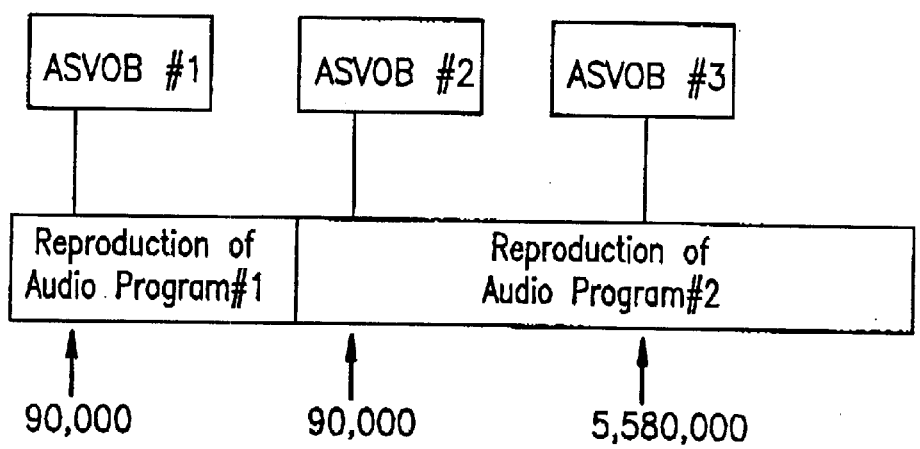
FIG. 20A is a diagram schematically illustrating the correspondence between the reproduction timing of the audio program and the display timing of the still picture.

FIG. 20A schematically shows the relationship between the reproduction timing of the audio program and the display timing of the still picture when the ASV reproduction mode 1062 is "slide show".

In the example shown in FIG. 15, the ASV reproduction mode 1062 of audio programs #3 and #4 is "browsable". In this case, the still picture is reproduced asynchronously with the audio information. The display of the still pictures corresponding to the display lists #1 and #2 of ATS_ASV_PBI#2 shown in FIG. 16B is updated in response to the user's operation or command. When no user's operation is performed within the display duration time period designated by the maximum display time period information 1111, the still picture is automatically switched to the next still picture.

For reproducing audio program #3, ASVU #2 1s selected based on the ASVU number 1061 corresponding to audio program #3. Before the reproduction of the audio program #3, ASVU#2 is read into the buffer of the reproduction apparatus. Next, the ATS_ASV_PBI#2 is referred to based on the addresses 1063 and 1064 of ATS_ASV_PBI. Since the audio program number 1104 of display list #1 of ATS_ASV_PBI#2 is "3", ASVOB#4 is displayed based on the ASV number 1101 of display list #1.

When a button of a remote control or the like corresponding to Next_DLIST is pressed, which instructs the reproduction of the next display list, ASVOB#5 is displayed based on the ASV number 1101 of display list #2 of ATS_ASV_PBI#2. When the display is switched from ASVOB#4 to ASVOB#5, the display effects in accordance with start effect mode 1106, the end effect mode 1107, the start effect period 1108, and the end effect period 1109 are provided.

When there is no user's operation during the display duration time period of 5,490,000 (i.e., about 1 minute) designated by the maximum display time period information 1111 of display list #1, ASVOB#5 is displayed based on the ASV number 1101 of the next display list #2. The display duration time period 5,490,000 matches the reproduction time period of audio program #3.

After the reproduction of audio program #3 is completed, audio program #4 is reproduced. When there is a user's operation during the reproduction of audio program #3, the display of ASVOB#4 is switched to the display of ASVOB#5 during the reproduction of audio program #3. When there is no user's operation during the reproduction of audio program #3, the display of ASVOB#5 is started simultaneously with the start of the reproduction of audio program #4.

When the reproduction is started from audio program #4, ASVU#2 is selected based on the ASVU number 1061 corresponding to audio program #4, and ASVU#2 is read into the buffer of the reproduction apparatus before the audio program #4 is reproduced. Then, ATS_ASV_PBI#2 is referred to based on the addresses 1063 and 1064 of ATS_ASV_PBI. Since the first display list, among the display lists included in ATS_ASV_PBI#2, which has audio program number 1104 of "4" is display list #2, ASVOB#5 is displayed based on the ASV number 1101 of display list #2.

After ASVOB#5 is displayed, the display of ASVOB#5 is changed in response to the user's operation or command. The audio program number of the display list is only effective when the ASVU is changed. In this case, the audio program number of the display list is referred to in order to determine the first ASVOB to be reproduced.

Figure 20B:
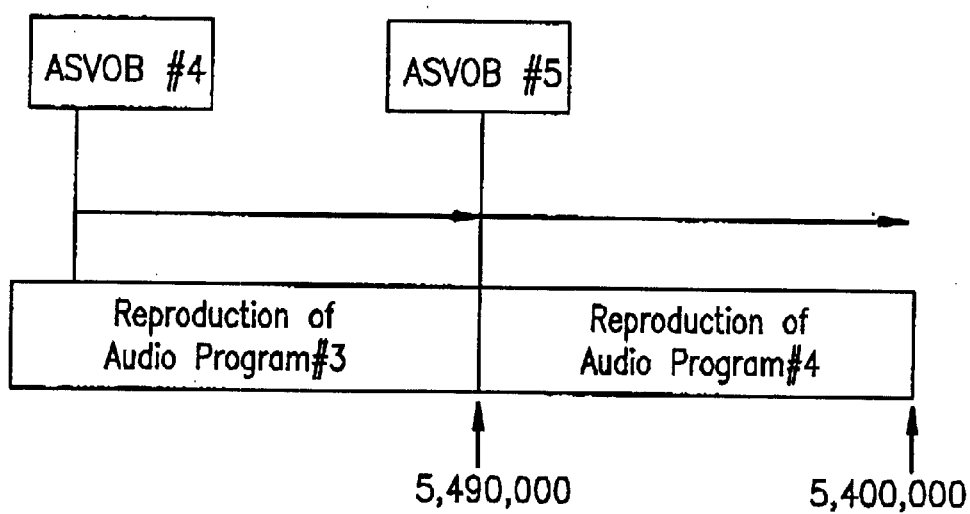
FIG. 20B is a diagram schematically illustrating the correspondence between the reproduction timing of the audio program and the display timing of the still picture.

FIG. 20B schematically shows the relationship between the reproduction timing of the audio program and the display timing of the still picture when the ASV reproduction mode 1062 is "browsable".

When the value of the maximum display time period information 1111 is a value representing "infiniteness", the corresponding ASVOB is continuously displayed until the user's operation is performed or a command is executed. As the value representing infiniteness, the maximum value (i.e. binary value in which all digits are "1") is usable, but other values are also usable. In the case of the "browsable" mode", a value representing "infiniteness" can always be set in the maximum display time period information 1111.

As described above, AOB and ASVOB are reproduced simultaneously by a decoder, unlike the reproduction of VOB.

The reproduction method of VOB and the reproduction method of AOB and ASVOB are identical with each other in that video information is output together with the audio information. However, in the case of ASVOB, the video information is still picture information including only I picture.

The reproduction method of VOB and the reproduction method of AOB and ASVOB are different from each other in the following points.

A first difference is in the storage position of the data. In the case of VOB, the audio information and the video information are multiplexed together and recorded on the optical disk as one system stream. In the case of AOB and ASVOB, the audio information and the video information are recorded in different areas of the optical disk as different system streams.

A second difference is in the synchronization method of the audio information and the still picture information. VOBs are processed for reproduction by a decoder one by one. An STC, which is a reference clock, is reset by an SCR (System Clock Reference) in the "pack header" in the first pack of the system stream. The decoder refers to the STC to output the audio information and the still picture information at the output timing represented by the PTS in the "packet header" in each pack.

AOBs and ASVOBs are processed for reproduction simultaneously by a decoder. A plurality of ASVOBs to be reproduced in synchronization with an AOB are read from the optical disk and input to the decoder before the AOB. The ASVOBs input to the decoder are not displayed immediately, unlike the VOB. The ASVOBs are decoded in accordance with the MPEG decode model. More specifically, the STC, which is the reference clock, is reset by the SCR in the first pack of each ASVOB. The ASVOB is decoded in accordance with the PTS in the packet. It can be considered that the post-decoding data of the plurality of ASVOBs to be reproduced in synchronization with the AOB is accumulated in the decoder, but actually, pre-decoding ASVOB data is accumulated in an appropriate buffer in the decoder.

When the ASVOB is completely input to the decoder, the AOB is read from the optical disk and input to the decoder. When the AOB is input to the decoder, the STC as the reference clock is reset by the SCR in the first pack of the AOB in a similar manner to the case of the VOB. The decoder refers to the STC to output the AOB at the output timing represented by the PTS in each pack header.

The information indicating the output timing of the ASVOB is stored in the display list, which is included in the PGC information. The area of the optical disk storing the information indicating the output timing of the ASVOB is different from the area of the optical disk storing the ASVOB. The information indicating the output timing of the ASVOB is supplied to the decoder separately from the ASVOB. Each ASVOB in the decoder is not output in synchronization with the STC, but is output in accordance with the information indicating the output timing of the ASVOB stored in the display list.

Thus, the output timing of the AOB is determined by the PTS accompanying the AOB itself, whereas the output timing of the ASVOB is determined by the information in the display list which is stored in a different area from the area storing the ASVOB.

Hereinafter, a reproduction apparatus for reproducing the information stored on the optical disk 100 will be described.

Figure 21:
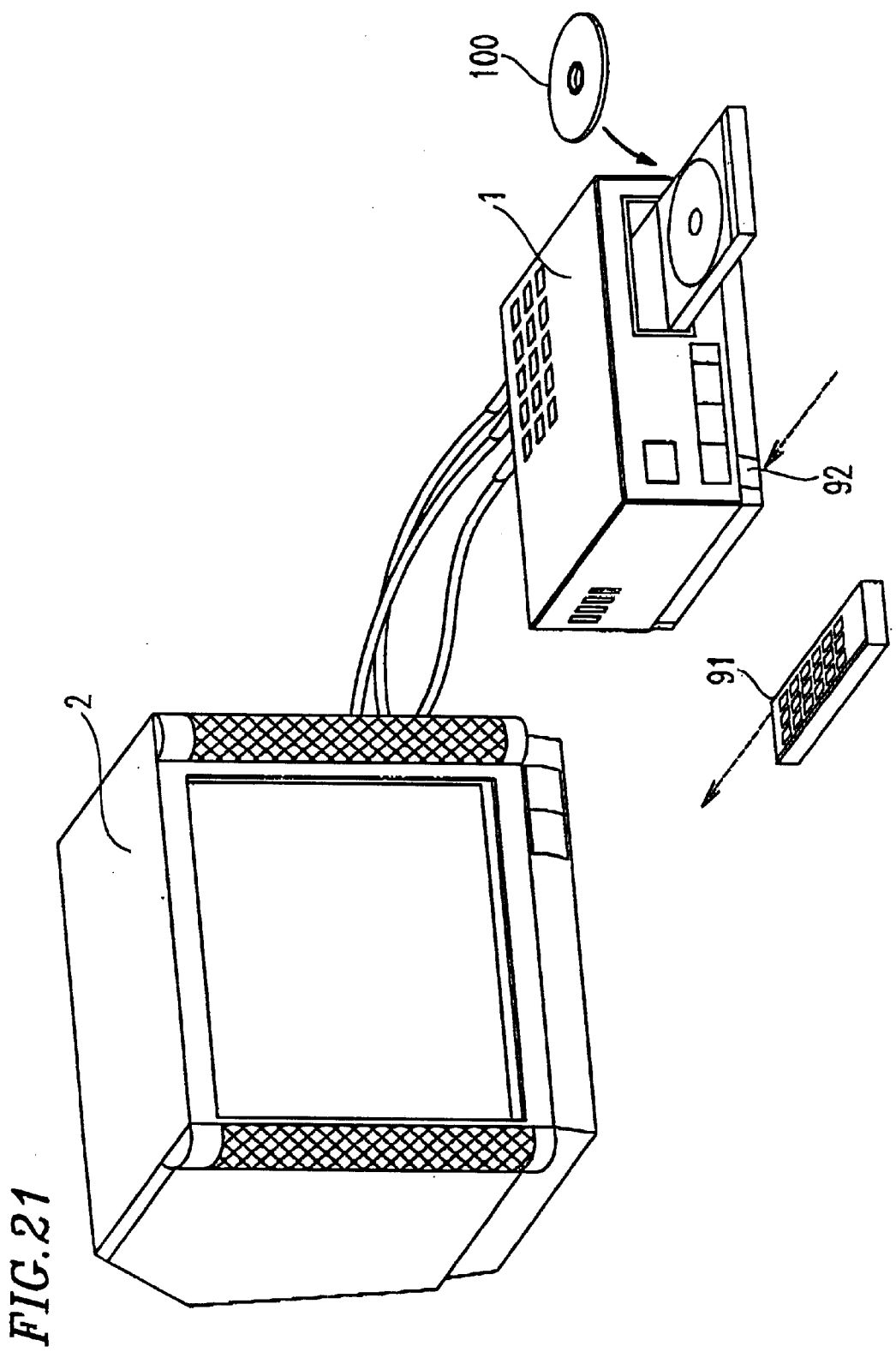
FIG. 21 is an external view of a DVD player 1, and a TV monitor 2 and a remote control 91 which are connected to the DVD player 1.

FIG. 21 shows an external view of a DVD player 1 as an exemplary reproduction apparatus for reproducing information stored in the optical disk (DVD) 100, and a large-screen household TV monitor 2 and a remote control 91 which are connected to the DVD player 1.

The DVD player 1 has an opening on a front surface of a chassis thereof. A driving mechanism (not shown) for loading the DVD 100 is provided in the DVD player 1 along a depth direction of the opening.

On the front surface of the DVD player 1, a remote control receiving section 92 having a light receiving element for receiving infrared rays from the remote control 91 is provided. When the user operates a button of the remote control 91, the infrared rays in accordance with the input from the user are emitted from the remote control 91. In response to the infrared rays received, the remote control receiving section 92 generates an interrupt signal which indicates that a signal is received from the remote control 91.

On a rear surface of the DVD player 1, a video output terminal and an audio output terminal (neither is shown) are provided. By connecting AV cords to the output terminals, a video signal reproduced from the DVD 100 can be output to the TV monitor 2. Thus, the user can enjoy the video reproduced from the DVD 100 through the large-screen household TV monitor 2 having a size of 33 inches or 35 inches.

As can be appreciated from the above, the DVD player 1 is not connected to a computer such as a personal computer for use but is connected to a household TV monitor such as the TV monitor 2 for use as a household electric appliance.

On the surface of the remote control 91, a plurality of buttons loaded by springs are provided. The remote control 91 outputs a code corresponding to the pressed button in the form of infrared rays.

Figure 22:
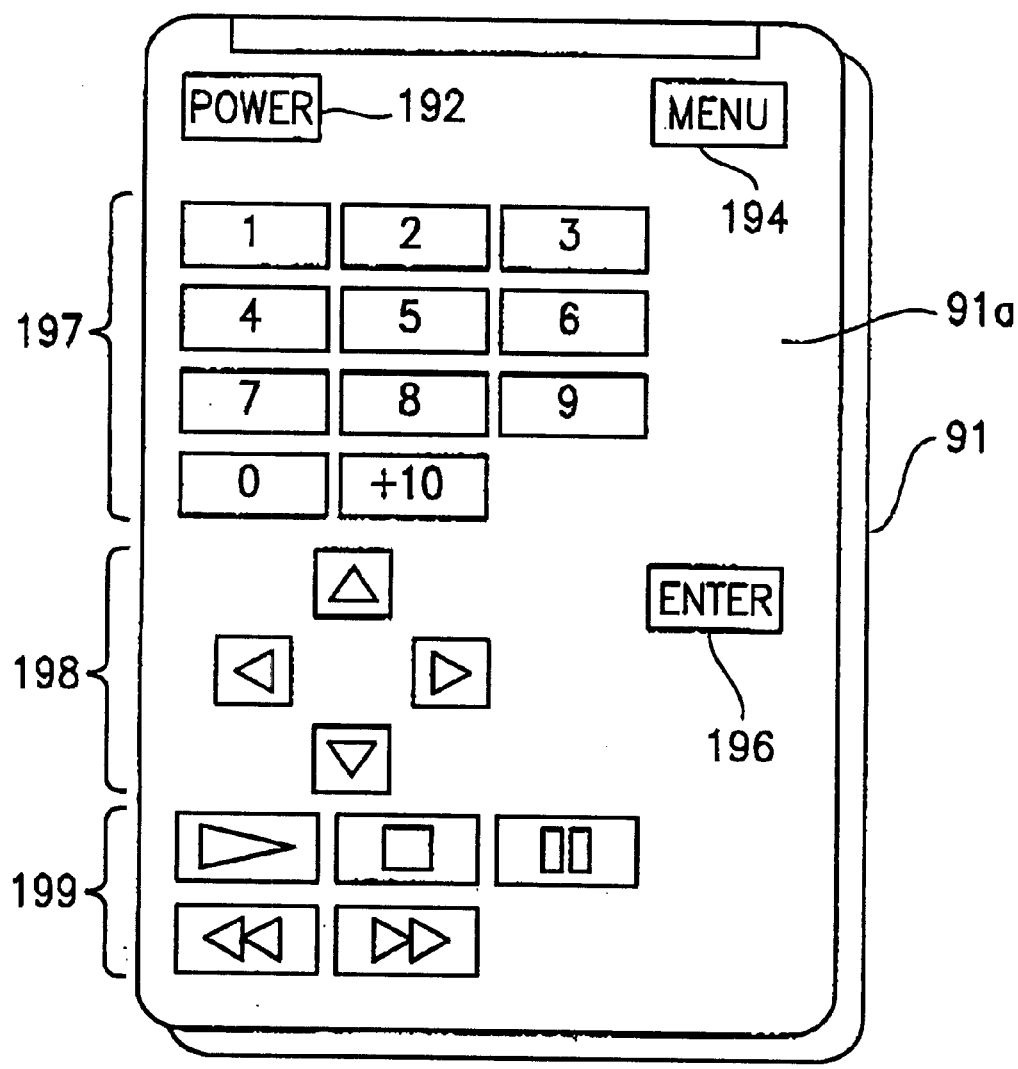
FIG. 22 is a view illustrating an exemplary operation panel 91a of the remote control 91.

FIG. 22 shows an exemplary operational panel 91*a* of the remote control 91. Various buttons are provided on the operational panel 91*a*.

A "power" button 192 is used for turning on or off the DVD player 1.

A "menu" button 194 is used for retrieving a title menu in the DVD 100 while video information or audio information in the DVD 100 is reproduced in accordance with the program chain. The "menu" button 194 is also used for retrieving a specified video stream (for example, branching menu) while a specified audio program included in the selected title is reproduced.

Numerical buttons (ten keys) 197 are used for instructing the DVD player 1 to perform chapter jump in the case of a movie, selection of a tune in the case of music, or the like.

Cursor buttons 196 are used for moving the cursor upward, downward, rightward and leftward to select an item.

An "enter" button 196 is used for finalizing the item selected by the cursor. When the cursor is positioned on the item, the item is displayed with a selection color defined by item color information in a management information pack. When the selection of the item is finalized by pressing the "enter" button 196, the item is displayed with a finalization color defined by item color information in the management information pack.

Buttons 199 are used for instructing the DVD player 1 to perform operations such as "reproduction", "stop", "pause", "fast forward", "rewinding" and the like. The buttons 199 are common with other AV apparatuses.

Figure 23:
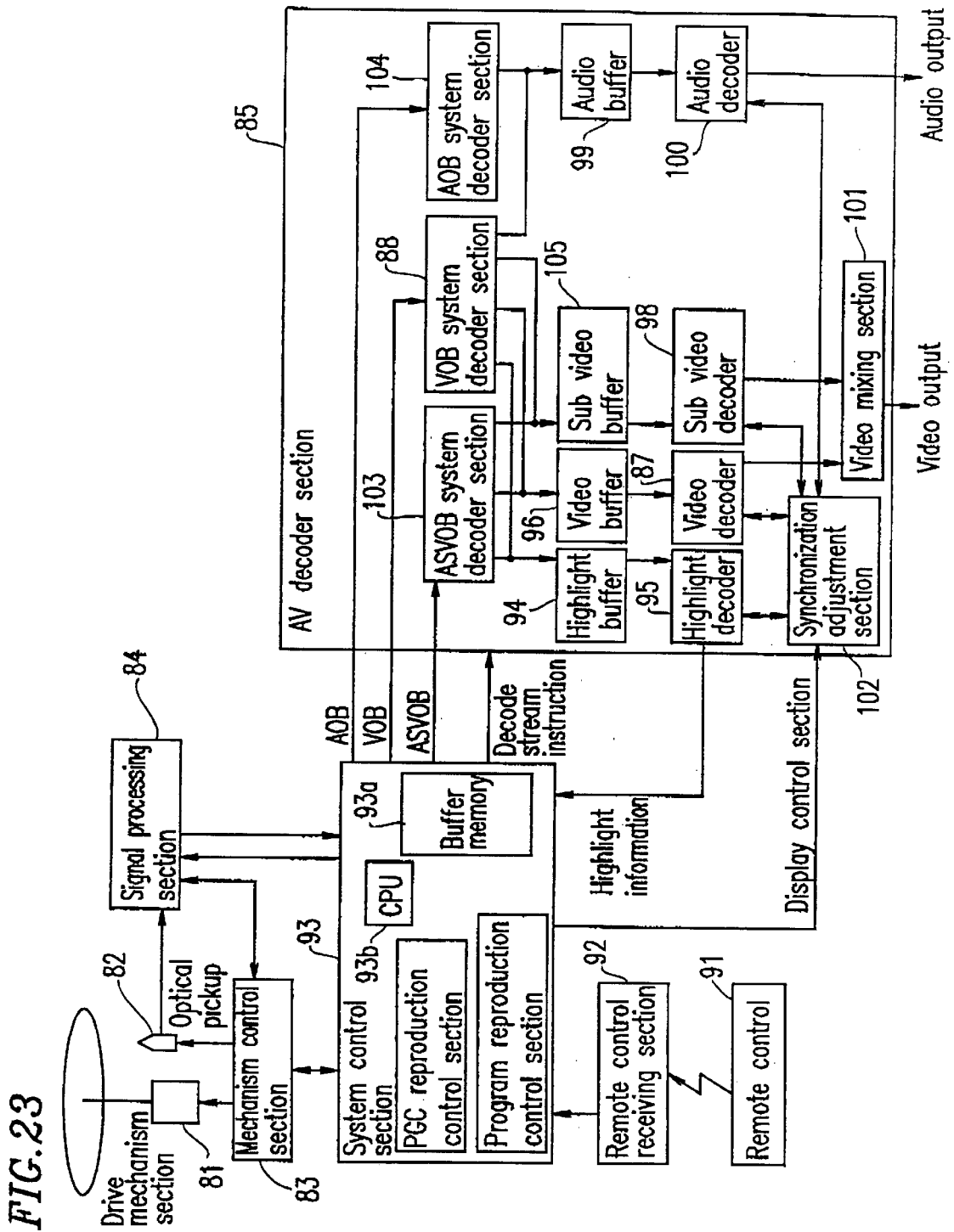
FIG. 23 is a block diagram illustrating the structure of the DVD player 1 in an example according to the present invention.

FIG. 23 shows a structure of a DVD player 1 in an example according to the present invention. As shown in FIG. 23, the DVD player 1 includes a drive mechanism section 81, an optical pickup 82, a mechanism control section 83, a signal processing section 84, an AV decoder section 85, the remote control receiving section 92, and a system control section 93.

The drive mechanism section 81 includes a table (not shown) on which the DVD 100 is set, and a motor (not shown) for clamping and rotating the DVD 100 set on the table. The motor is, for example, a spindle motor. The table on which the DVD 100 is to be set moves inward and outward the chassis by an eject mechanism section (not shown). The user sets the DVD 100 on the table where the table is outside the chassis. Then, the table having the DVD 100 thereon is moved inside the chassis. Thus, the DVD 100 is loaded on the DVD player 1.

The mechanism control section 83 controls a mechanism system including the drive mechanism section 81 for driving the DVD 100 and the optical pickup 82 for reading a signal stored on the DVD 100. Specifically, the mechanism control section 83 adjusts the speed of the motor in accordance with the position of the track indicated by the system control section 93. The mechanism control section 83 also controls the movement of the optical pickup 82 by controlling an actuator (not shown) of the optical pickup 82. When the accurate position of the track is detected by servo control, the mechanism control section 83 watts for a desired physical sector and then continuously reads signals from the desired physical sector.

The signal processing section 84 processes the signal read by the optical pickup 82 with amplification, waveform rectification, binarization, demodulation, error detection, and other processing. The signal read by the optical pickup 82 is converted into digital data and stored in a buffer memory 93*a* of the system control section 93 on a logical block-by-logical block unit.

The system control section 93 includes a CPU 93*b*. Reproduction processing performed by the reproduction apparatus (for example, PGC reproduction control processing, program reproduction control processing, and the like) can be stored on a recording medium in the form of a program. Such a recording medium can be a floppy disk or a CD-ROM. The program stored on the recording medium is installed in the system control section 93 via, for example, a floppy disk drive (not shown). The CPU 93b executes the program installed in the system control section 93 from the recording medium. Thus, the system control section 93 can execute reproduction processing corresponding to the installed program.

The AV decoder section 85 includes an ASVOB system decoder section 103, an AOB system decoder section 104, and a VOB system decoder section 88. The AV decoder section 85 is structured so as to operate these three system decoders 103, 104 and 88 to operate synchronously or asynchronously with one another. To the ASVOB system decoder section 103, an ASVOB including still picture data is input. To the AOB system decoder section 104, an AOB including audio data is input. To the VOB system decoder section 88, a VOB for video title set menu including audio data and video data in a multiplexed state and the like are input.

The ASVOB system decoder section 103 receives an ASVOB stream and distinguished a stream ID and a sub stream ID in the header of each packet included in the ASVOB stream from each other to divide the ASVOB stream into a video packet, a PCI (highlight) packet, and a sub video packet.

The AOB system decoder section 104 receives an AOB stream and divides the data based on the packet header included in the AOB stream.

The VOB system decoder section 88 receives a VOB stream and distinguishes a stream ID and a sub stream ID in the header of each packet included in the VOB stream from each other to divide the VOB stream into an audio packet, a video packet, a PCI (highlight) packet, and a sub video packet.

The AV decoder section 85 includes a highlight buffer 94, a video buffer 96, a sub video buffer 105, an audio buffer 99, a highlight decoder 95, a video decoder 87, a sub video decoder 98, an audio decoder 100, a synchronization adjustment section 102, and a video mixing section 101.

The highlight information output from the PCI (highlight) packets of the ASVOB system decoder section 103 and the VOB system decoder section 88 is temporarily stored in the highlight buffer 94.

The video packets output from the ASVOB system decoder section 103 and the VOB system decoder section 88 are temporarily stored in the video buffer 96.

The sub video packets output from the ASVOB system decoder section 103 and the VOB system decoder section 88 are temporarily stored in the sub video buffer 105.

The audio packets output from the AOB system decoder section 104 and the VOB system decoder section 88 are temporarily stored in the audio buffer 99.

The highlight decoder 95 decodes the highlight information from the PCI (highlight) packets which is stored in the highlight buffer 94. The decoded highlight information is output to the system control section 93.

The video decoder 87 decodes the video data stored in the video buffer 96.

The sub video decoder 98 decodes the sub video data stored in the sub video buffer 105.

The audio decoder 100 decodes the audio data stored in the audio buffer 99. The output from the audio decoder 100 (decoding result) is output as an audio output.

The video mixing section 101 mixes the output from the video decoder 87 (decoding result) and the output from the sub video decoder 98 (decoding result) to generate one piece of video data. The output from the video mixing section 101 is output as a video output.

The synchronization adjustment section 102 manages the synchronization of operations of the highlight decoder 95, the video decoder 87, the sub video decoder 98 and the audio decoder 100.

Before starting the reproduction, the system control section 93 determines whether the reproduction mode is video-oriented or not. When the reproduction mode is determined to be video-oriented, the video manager is read based on the information read from the volume file management area.

The system control section 93 refers to the PGC management information table for the menu of the video manager to calculate a recording address of the program chain for the volume menu. The system control section 93 reproduces and holds inside the recording address. When the recording address of the program chain for the volume menu is hold inside, the system control section 93 refers to the held PGC information to calculate the video object (VOB) to be reproduced and the recording address thereof on the optical disk 100. When the video object to be reproduced is determined, the system control section 93 outputs a control signal to the mechanism control section 83 and the signal processing section 84 to retrieve the determined video object from the optical disk 100 and reproduces the video object in the following manner.

The VOB is input to the AV decoder section 85. A decode stream instruction "VOB reproduction" is given to the AV decoder section 85 from the system control section 93.

The VOB stream input to the AV decoder section 85 is divided into various packs included in the VOB stream by the VOB system decoder section 88. Audio, video, sub video, and highlight information packs are respectively input to the audio buffer 99, the video buffer 96, the sub video buffer 105, and the highlight buffer 94. The highlight buffer 94 buffers only the highlight information in the PCI (highlight) packet in the highlight information pack.

The data input to each buffer is input to the audio decoder 100, the video decoder 87, the sub video decoder 98, and the highlight decoder 95 for decoding.

The audio information for the menu is output from the audio decoder 100. The output from the video decoder 87 and the output from the sub video decoder 98 are mixed together by the video mixing section 101. The mixing result is output as a video output. The output from the highlight decoder 95 is read into the system control section 93. As a result, the button information or the like of each menu is stored in the memory in the system control section 93.

In this manner, a video menu for allowing the user to select one of a plurality of titles is displayed.

Figure 24:
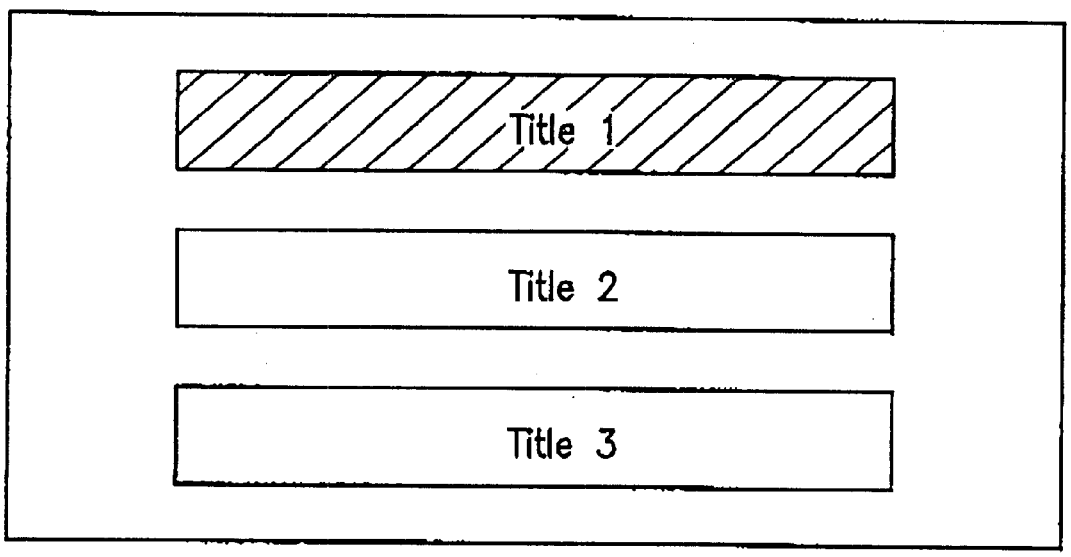
FIG. 24 is a view illustrating an exemplary video menu.

FIG. 24 shows an exemplary menu.

The user views the video menu shown in FIG. 24, and selects and finalizes one of a plurality of items in the video menu. For example, the user selects and finalizes the item in which he/she is interested.

It is assumed that the user designates a menu item number corresponding to either one of "title 1", "title 2" or "title 3" shown in FIG. 24 using the remote control 91. The system control section 93 receiving the designation of the menu item number from the remote control 91 refers to the button information of the highlight information in the PCI (highlight) pack included in the VOB of the video menu which is being reproduced to execute the control command corresponding to the designated number. The button information is pre-stored in the memory. The control command is, for example, "PlayTitle #n", wherein, "n" represents the title number to be reproduced.

For executing the command "PlayTitle #n", the system control section 93 refers to a title search pointer table, which is a part of the audio manager, to determine the audio title set (ATS) and the title number in the ATS.

When the audio title set is selected, the system control section 93 outputs a control signal to the mechanism control section 83 and the signal processing section 84 to reproduce the audio title set management information of the selected audio title set, sequentially reads the audio title set PGC information search pointers, which are a part of the audio title set management information, and determines the PCC information of the program chain for starting the reproduction of the title to be reproduced.

When the PGC information is determined, the system control section 93 outputs a control signal to the mechanism control section 83 and the signal processing section 84 to reproduce the determined PGC information and hold the PGC information in the inside buffer for PGC information.

When the PGC information for starting the reproduction of the title is held, the system control section 93 refers to the held PGC information to obtain the ASVU number of the first audio program information. The system control section 93 refers to the audio still video unit general information (ASVU_GI) corresponding to the ASVU number to read the ASVOB corresponding to the first audio program of the PGC information from the optical disk and input the audio still video unit general information to the AV decoder section 85. A decode stream instruction "ASVOB reproduction" is given to the AV decoder section 85 from the system control section 93. The AV decoder section 85 divides the ASVOB into packs and packets by the ASVOB system decoder section 103 and stores the packs and packets in the corresponding buffers.

The size of the video buffer 96 needs to be equal to or greater than the maximum value of the sum of the sizes of the ASVOBs in the ASVU. In order to guarantee that the optical disk 100 is reproducible by any player, all the reproduction apparatuses are required to include a video buffer 96 of a certain capacity or greater. The certain capacity to the maximum value of the total data amount of the ASVOBs included in the ASVU. In this example, the maximum value is 2 Mbytes. One I picture is 100 kbytes to 200 kbytes, and thus the 10 to 20 I pictures can be reproduced together with the audio information.

When all the ASVOBs included in the ASVU are completely input to the ASVOB system decoder section 103, neither the highlight decoder 95, nor the video decoder 87, nor the sub video decoder 98 performs decoding when all the ASVOBs are stored in the corresponding buffers, the audio object to be reproduced and the recording address thereof are determined by the audio title set program information table and audio title set cell reproduction information table. The AOB determined in this manner is reproduced by a control signal output to the mechanism control section 83 and the signal processing section 84.

The AOB read from the optical disk 100 is input to the AV decoder section 85. A decode stream instruction "AOS reproductions" is given to the AV decoding section 85 from the system control section 93. The AOB is made into an audio stream by the AOB system decoder section 104. The audio stream is input to the audio decoder 100 through the audio buffer 99. Thus, the audio data is prepared to be output. When the audio data is prepared to be output, the STC (reference clock) in the synchronization adjustment section 102 is reset by the SCR in the first pack of the AOB. The audio data of the AOB is output at the timing of the PTS stored in the packet header. When the output of the AOB is started, the first I picture of the ASVOB, and the highlight information and the sub picture information for the menu item which is to be displayed in an overlapping state with the I picture are decoded and output at the instruction of the synchronization adjustment section 102. It is not guaranteed that the PTS is described in all the packets of the AOB, but the audio decoder 100 outputs the audio data while supplementing the PTS.

The system control section 93 hold the still picture reproduction information of the PGC information. The still picture reproduction information includes the display timing of the still picture. The system control section 93 outputs the display control information of the still picture information to the synchronization adjustment section 102 of the AV decoder section 85 in accordance with the display timing of the still picture reproduction information. The display control information includes a wait period until the I picture of the ASVOB to be updated is designated and the update thereof is displayed. The synchronization adjustment section 102 instructs the video decoder 87 to output the designated I picture at the designated timing in accordance with the input display control information.

In other words, the ASVOB is output in accordance with the display timing information stored in an area which is different from the area storing the ASVOB, unlike the case of the AOB or VOB.

In this manner, before the audio data is reproduced, the ASVU data corresponding to the audio data is all stored in the corresponding buffers. Therefore, the highlight buffer 94, the video buffer 96, and the sub video buffer 105 need to have a capacity larger than that of the buffer defined in the MPEG2 or DVD-Video Standard.

Figure 25:
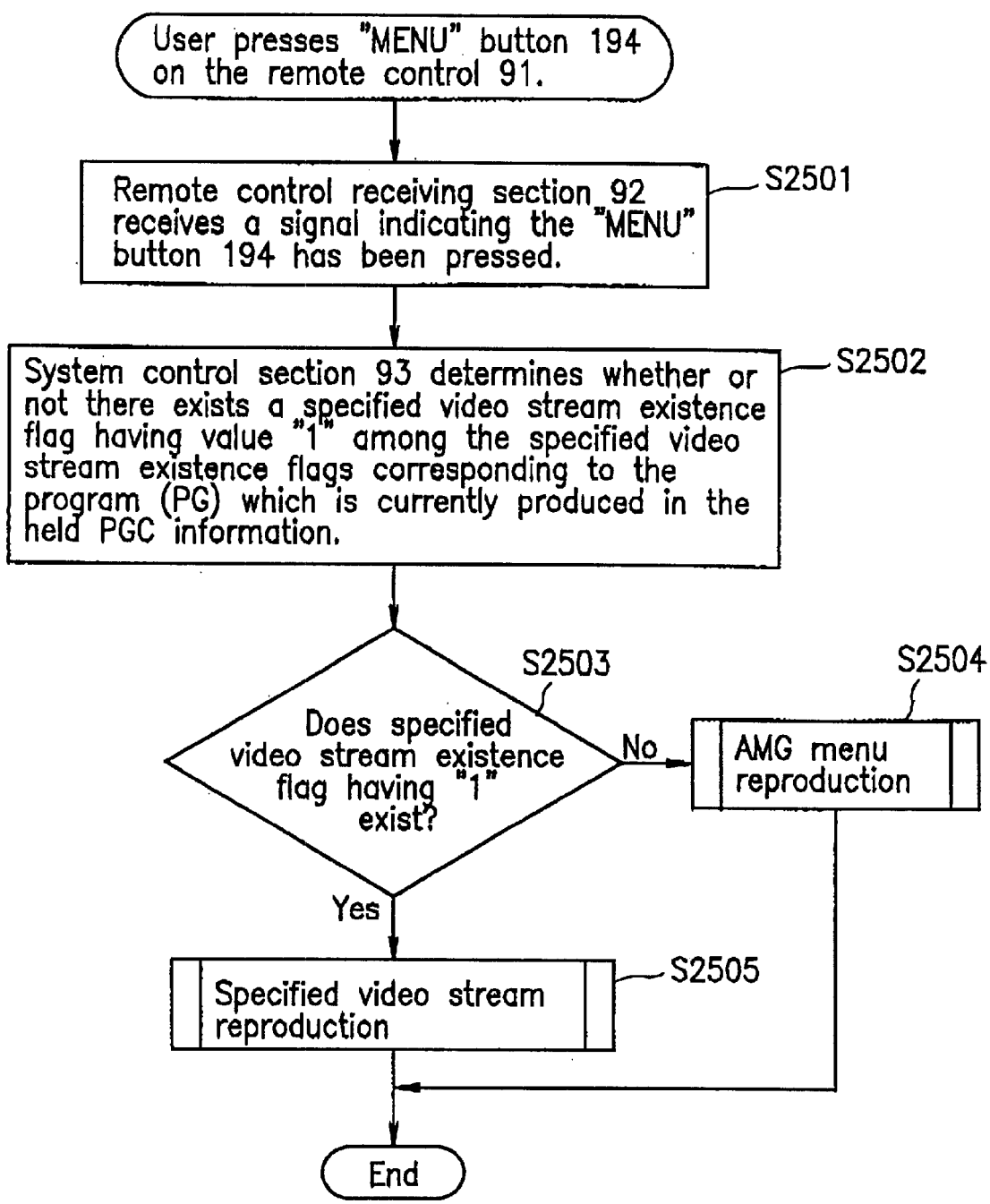
FIG. 25 is a flowchart illustrating an operation of a reproduction apparatus when the "menu" button 194 of the remote control 91 is pressed.

FIG. 25 is a flowchart of an exemplary operation of the DVD player 1 when the "menu" button 194 of the remote control 91 is pressed.

When the user presses the "menu" button 194 of the remote control 91, the remote receiving section 92 receives a signal indicating that the "menu" button 194 has been pressed (step S2501).

The system control section 93 determines whether or not there exists a specified video stream existence flag having value "1" among the specified video stream existence flags corresponding to the program (PG) which is currently reproduced in the held PGC information (i.e., whether the specified video stream exists or not) (step S2502).

When it is determined that all the specified video stream existence flags are "0" in step S2503, the AMG menu reproduction processing (FIG. 27) is retrieved (step S2504).

When it is determined that there exists a specified video stream existence flag having value "1" among the specified video stream existence flags in step S2503, the specified video stream reproduction processing (FIG. 26) is retrieved (step S2505).

Figure 26:
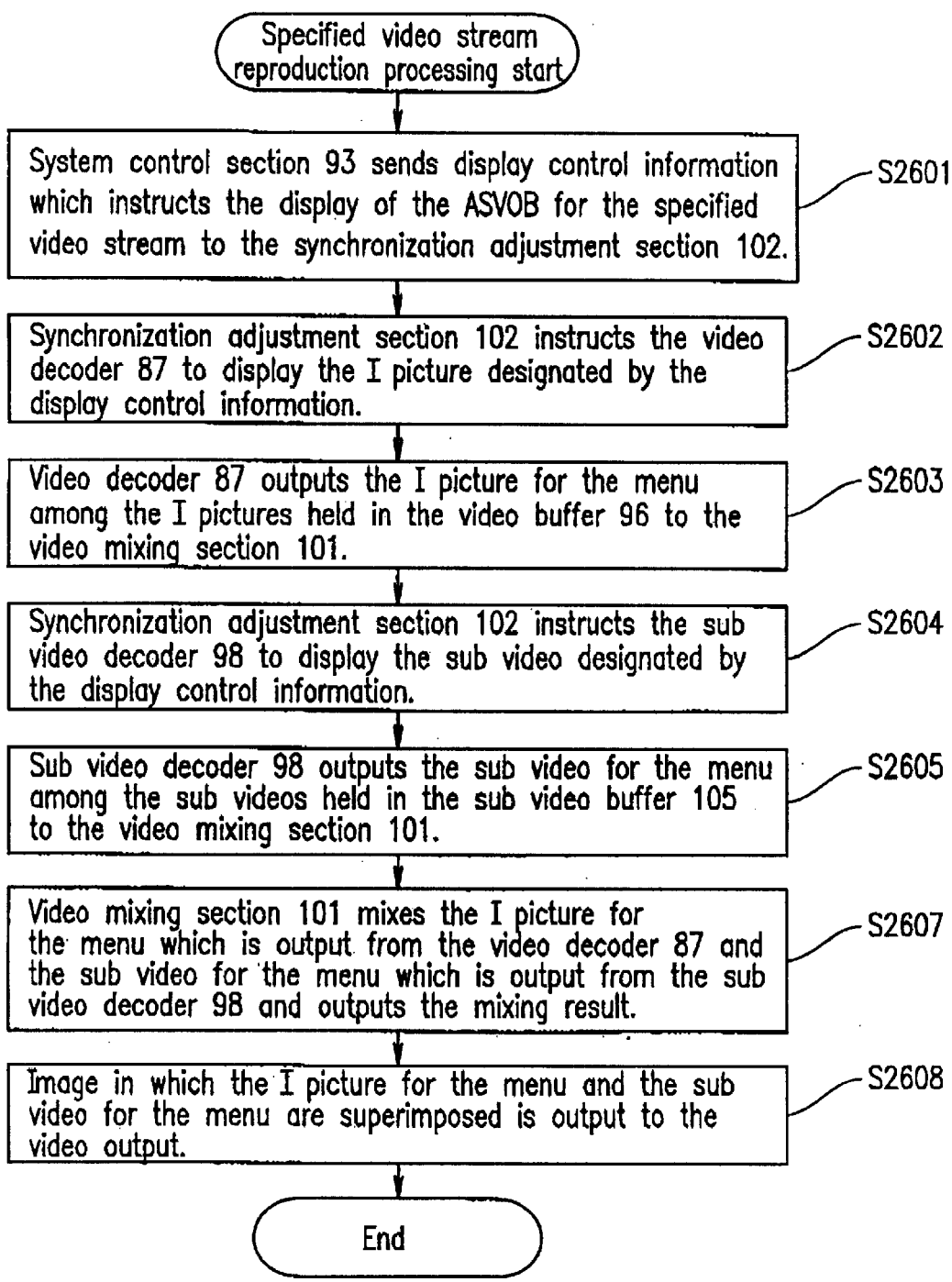
FIG. 26 is a flowchart illustrating specified video stream reproduction processing.

FIG. 26 is a flowchart of specified video stream reproduction processing. The specified video stream reproduction processing indicates reproduction of a specified still picture among a plurality of still pictures corresponding to the audio program. The specified still picture is, for example, used as a menu for allowing the user to select one of the plurality of still picture groups.

The system control section 93 sends display control information which instructs the display of the ASVOB for the specified video stream from the held PGC information to the synchronization adjustment section 102 (step S2601). The ASVOB for the specified video stream is, for example, the final ASVOB in the ASVU.

The synchronization adjustment section 102 instructs the video decoder 87 to display the I picture designated by the display control information (step S2602).

The video decoder 87 outputs the I picture used for the menu among the I pictures held in the video buffer 96 to the video mixing section 101 (step S2603).

The synchronization adjustment section 102 instructs the sub video decoder 98 to display the sub video designated by the display control information (step S2604).

The sub video decoder 98 outputs the sub video used for the menu among the sub videos held in the sub video buffer 105 to the video mixing section 101 (step S2605).

The video mixing section 101 mixes the I picture used for the menu which is output from the video decoder 87 and the sub video used for the menu which is output from the sub video decoder 98 and outputs the mixing result (step S2607).

An image in which the I picture for the menu and the sub video for the menu are superimposed is output to the video output (step S2608). The image is displayed on, for example, the TV monitor 2 connected to the DVD player 1. The user can watch the image displayed on the TV monitor 2.

Figure 27:
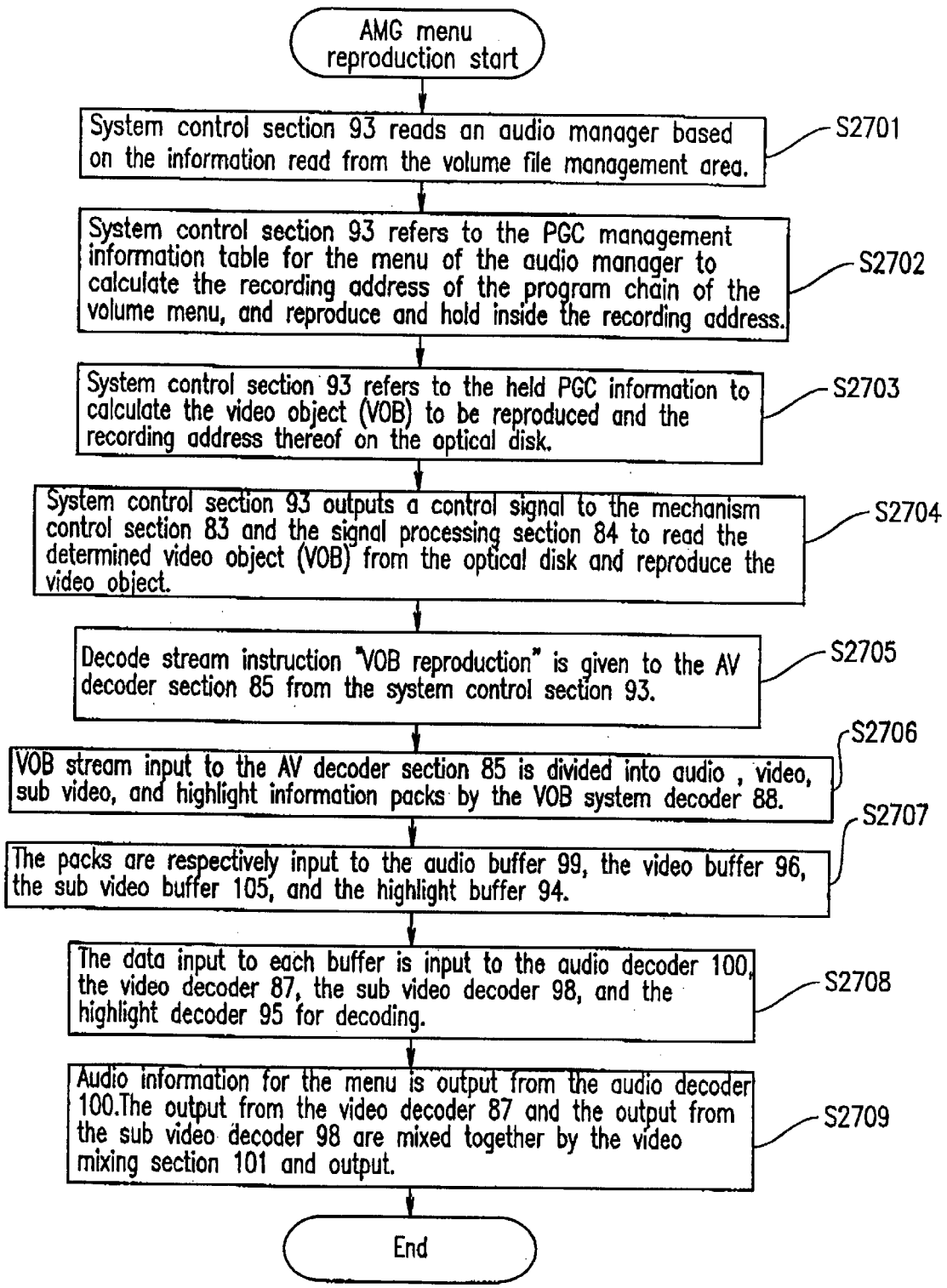
FIG. 27 is a flowchart illustrating AMG menu reproduction processing.

FIG. 27 is a flowchart of AMG menu reproduction processing. The AMG menu reproduction processing indicates reproduction of the AMG menu, which is a video menu for allowing the user to select the title to be reproduced among a plurality of titles shown in FIG. 24.

The system control section 93 reads an audio manager based on the information read from the volume file management area (step S2701).

The system control section 93 refers to the PGC management information table for the menu of the audio manager to calculate the recording address of the program chain of the volume menu, and reproduce and hold inside the recording address (step S2702).

When the recording address of the program chain of the volume menu is held inside, the system control section 93 refers to the held PGC information to calculate the video object (VOB) to be reproduced and the recording address thereof on the optical disk 100 (stop S2703).

When the video object to be reproduced is determined, the system control section 93 outputs a control signal to the mechanism control section 83 and the signal processing section 84 to read the determined video object (VOB) from the optical disk 100 and reproduce the video object (step S2704).

The VOB system stream is input to the AV decoder section 85. Simultaneously, a decode stream instruction "VOB reproduction" is given to the AV decoder section 85 from the system control section 93 (step S2705).

The VOB stream input to the AV decoder section 85 is divided into various packs (i.e., audio, video, sub video, and highlight information packs) included in the VOB stream by the VOB system decoder section 88 (step S2706).

The packs are respectively input to the audio buffer 99, the video buffer 96, the sub video buffer 105, and the highlight buffer 94 (step S2707). The highlight buffer 94 buffers only the highlight information in the PCI (highlight) packet in the highlight information pack.

The data input to each buff or is input to the audio decoder 100, the video decoder 87, the sub video decoder 98, and the highlight decoder 95 for decoding (step S2708).

The audio information for the menu is.output from the audio decoder 100. The output from the video decoder 87 and the output from the sub video decoder 98 are mixed together by the video mixing section 101 and output (step S2709).

The output from the highlight decoder 95 is read into the system control section 93. As a result, the button information or the like of each menu is stored in the memory in the system control section 93. In this manner, the AMG menu shown in FIG. 24 is displayed.

Figure 28:
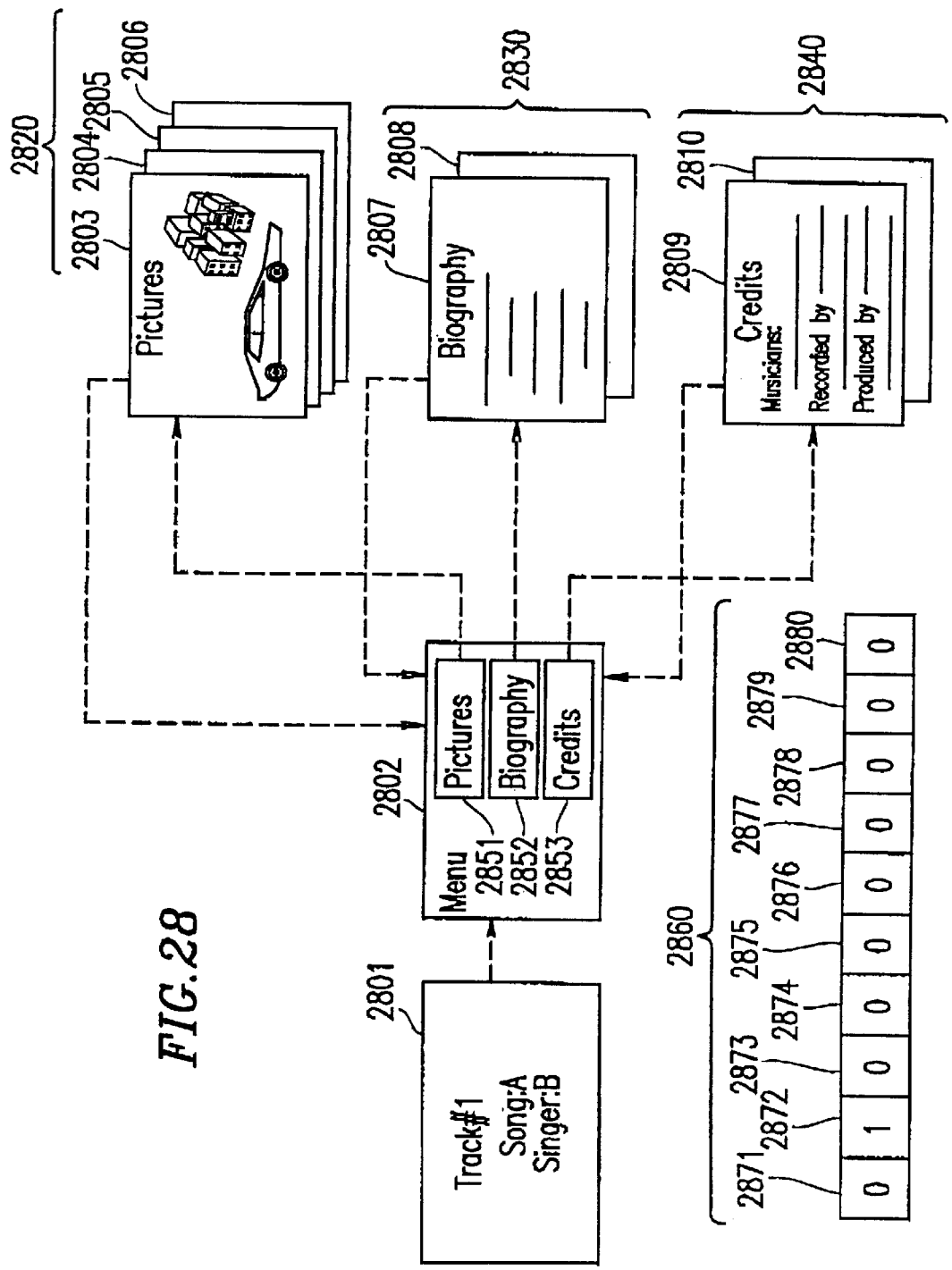
FIG. 28 is a view illustrating an image of a title which can be created by the specified video stream reproduction processing.

FIG. 28 shows an image of a title which can be created by the specified video stream reproduction processing described with reference to FIG. 26.

In FIG. 28, reference numerals 2801 through 2810 represent still pictures reproduced with high quality audio information. The dotted arrows represent the order of display of the still pictures.

FIG. 28 shows a still picture group 2820 labeled "Pictures", a still picture group 2830 labeled "Biography", and a still picture group 2840 labeled "Credits". Herein, the term "still picture group" refers to a plurality of one or more still pictures which are grouped together.

The still picture group 2820 includes still pictures 2803 through 2806 which are photos of players of tunes and pictures related to the tune. The still picture group 2830 includes still pictures 2807 and 2808 representing summary of the career and list of works of the players of the tunes as texts and photos. The still picture group 2840 includes still pictures 2809 and 2810 representing the players, recording engineers, producers and the like of the tunes mainly as texts.

The still picture 2802 labeled "Menu" is used for selecting one of the plurality of still picture groups. On the still picture 2802, a "Pictures" button 28651 and a "Biography" button 2852, and a "Credits" button 2853 are displayed.

The still pictures 2801 through 2810 shown in FIG. 28 are reproduced in the order described in the reproduction control information which is stored on the optical disk 100. However, the still picture 2802 is structured so as to be displayed after switching from another arbitrary still picture in response to the input from the user. For example when the user presses the "Menu" button 194 on the remote control 91 while the still picture group 2820 labeled "Pictures" are reproduced, the still picture which is being reproduced is switched to the still picture 2802 without any interruption in sound reproduced. As a result, the any one of the still picture groups 2820, 2830 and 2840 can be selected.

When the "Pictures" button 2851 is selected while the still picture 2802 is displayed, the still picture 2802 is switched to a still picture in the still picture group 2820 (for example, the still picture 2803) without any interruption in sound reproduced. When the "Biography" button 2852 or the "Credits" button 2853 is selected while the still picture 2802 is displayed, the still picture 2802 is switched to another still picture in a similar manner.

For displaying the still picture 2802, the above-mentioned ASVOB for the specified video stream to used.

In FIG. 28, reference numeral 2860 represents flag information indicating the specified still picture acting as a menu among the plurality of still pictures 2801 through 2810. The flag information 2860 includes a plurality of specified video stream existence flags 2871 through 2880 respectively corresponding to the plurality of still pictures 2801 through 2810. Each of the plurality of specified video stream existence flags 2871 through 2880 can be included in, for example, the display list 1071 as the specified video stream existence flag 1102 shown in FIGS. 11A through 11D.

In the example shown in FIG. 28, the still picture 2802 is the specified still picture acting as the menu. Accordingly, the value of the specified video stream existence flag 2872 corresponding to the still picture 2802 is set to "1". The value of the specified video strewn existence flags 2871 and 2873 through 2880 corresponding to all the other still pictures 2801 and 2803 through 2810 is set to "0". When the "Menu" button 194 on the remote control 91 is pressed, the still picture 2802 corresponding to the specified video stream existence flag 2872 having the value "1" is displayed regardless of which other still picture is being reproduced.

The value of "0" of all the specified video stream existence flags 2871 through 2880 included in the flag information 2860 indicates that the plurality of still pictures 2801 through 2810 do not include any specified still picture acting as the menu.

The flag information 2860 can be defined for each of a plurality of audio programs (for examples, a plurality of tunes) included in the audio title set.

By using the flag information 2860 defined for each of the plurality of audio programs (for examples, a plurality of tunes) included in the audio title set, different specified still pictures (for example, menus) for different audio programs (for examples, different tunes) can be retrieved by a common button (for example, the "menu" button 194 of the remote control 91).

The present invention is not limited to the above-described example.

In the above example, the specified video stream existence flag 1102 is stored in the audio still video reproduction information (ATS_ASV_PBI) 1029 as shown in FIGS. 11A through 11D. However, the storage position of the specified video stream existence flag 1102 is not limited to this. The specified video stream existence flag 1102 can be stored in other positions on the optical disk 100. Alternatively, additional information can be added to the specified video stream existence flag 1102 and stored. In this manner, high speed reproduction is realized.

For example, the area in each of FIGS. 11A and 11B ("slide show mode") which stores the program number 1104 is replaced with a reserved area in each of FIGS. 11C and 11D ("browsable mode"). In the case where the existence of the specified video stream existence flag 1102 is permitted only in the "browsable mode", the number of the audio still video display list (ASV_DLIST) 1071 referring to the specified video stream for the menu can be recorded in the reserved area. Specifically, when the number is "0", it is understood that there is no specified video stream for the menu; and when the number is not "0", it is understood that the number is the number of the ASV_DLIST, which is to be referred to.

Referring to FIG. 10, bit 7 of the audio still video reproduction mode (ASV_DMOD) 1062 in the audio still video reproduction information search pointer (ATS_PG_ASV_PBI_SRP) 1028 in the audio title set audio still video reproduction information table (ATS_ASV_PBIT) 1014 may be a reserved area. In such a case, a flag indicating whether or not the specified video stream for the menu exists in this program (PG) can be recorded in bit 7 of the ASV reproduction mode 1062. In this case, it is easier to confirm that there is no specified video stream for the menu in the program (PG) than in the case of recording the specified video stream existence flag 1102 in the audio still video display list (ASV_DLIST) 1071 shown in FIG. 11A through 11D. The reason is that when the flag is recorded in bit 7 of the ASV reproduction mode 1062, it is possible to confirm that there is no specified video stream for the menu in the program (PG) merely by checking bit 7 of the ASV reproduction mode 1062 instead of checking all the specified video stream existence flags 1102 in the display list 1071.

Referring to FIG. 10, bit 7 and bit 6 of the audio still video reproduction mode (ASV_DMOD) 1062 in the audio still video reproduction information search pointer (ATS_PG_ASV_PBI_SRP) 1028 in the audio title set audio still video reproduction information table (ATS_ASV_PBIT) 1014 may be reserved areas. In such case, a specified video stream existence flag can be recorded in each of bit 7 and bit 6. When bit 7 of the ASV reproduction mode 1062 is 1, it is understood that the ASVOB reproduced in the first audio still video display list (ASV_DLIST) 1071 in the audio still video reproduction information (ATS_ASV_PBI) 1029 designated by the audio still video reproduction information search pointer 1028 is the specified video stream used as the menu. When bit 6 of the ASV reproduction mode 1062 is 1, it is understood that the ASVOB reproduced in the final audio still video display list (ASV_DLIST) 1071 in the audio still video reproduction information (ATS_ASV_PBI) 1029 designated by the audio still video reproduction information search pointer 1028 is the specified video stream used as the menu. By this method, the reproduction apparatus can always determine whether or not there is a specified video stream used as the menu, by referring to the specified position.

Referring to FIG. 10, bits 7 through 4 of the audio still video reproduction mode (ASV_DMOD) 1062 in the audio still video reproduction information search pointer (ATS_PG_ASV_PBI_SRP) 1028 in the audio title set audio still video reproduction information table (ATS_ASV_PBIT) 1014 may be reserved areas. In such a case, the number of the audio still video display list (ASV_DLIST) 1071 referring the specified video stream can be recorded in bits 7 through 4 of the ASV reproduction mode. Specifically, when the number is "0", it in understood that there is no specified video stream for the menu; and when the number is a value other than "0" (1 through 15), it is understood that the number is the number of the ASV_DLIST to be referred to. By this method, the reproduction apparatus can determine whether or not there is a specified video stream and specify the position of the specified video stream, by referring to the audio still video reproduction information search pointer 1028. As a result, the search performed by the reproduction apparatus becomes easier.

Referring to FIG. 10, the 5th byte of audio title set program information (ATS_PG) 1026 in the audio title set program information table (ATS_PG_IT) 1012 may be a reserved area. In such a case, the number of the audio still video display list (ASV_DLIST) 1071 referring the specified video stream can be recorded in the 5th byte of the audio title set program information (ATS_PG) 1026. Specifically, when the number is "0", it is understood that there is no specified video stream for the menu; and when the number is a value other than "0" (1 through 255), it is understood that the number is the number of the ASV_DLIST to be referred to. By this method, the reproduction apparatus can determine whether or not there is a specified video stream and specify the position of the specified video stream, by referring to the audio title set program information 1026. As a result, the search performed by the reproduction apparatus becomes easier.

Referring to FIG. 8, bits 55 through 50 of the audio still video unit general information (ASVU_GI) in the audio still video unit management information (ASVUI) 811 may be a reserved area. In such a case, the number of the audio still video display list (ASV_DLIST) 1071 referring the specified video stream can be recorded in bits 55 through 50 of the audio still video unit general information. Specifically, when the number is "0", it is understood that there is no specified video stream for the menu; and when the number is a value other than "0" (1 through 63), it is understood that the number is the number of the ASV_DLIST to be referred to.

In the above-described example, when the "menu" button 194 of the remote control 91 is pressed, the AMG menu is displayed where the specified video stream flag is 0, and the ASVOB for the specified video stream for the menu where the specified video stream flag is 1. Alternatively, the display of the AMG menu and the ASVOB for the specified video stream for the menu can be assigned to different buttons. For example, it can be structured so that when the "Title" button of the remote control 91 is pressed, the AMG menu is reproduced; and when the "menu" button is pressed, the ASVOB for the specified video stream for the menu is reproduced.

As described above, according to the optical disk, reproduction apparatus and reproduction method of the present invention, different specified still pictures (for examples, menus) can be retrieved for different audio programs (for example, different tunes) included in one audio title, by operating a common button.

The specified still picture can be displayed with no interruption in the sound.

Since different specified sill pictures (for examples, menus) can be displayed for different audio programs (for example, different tunes), an optimum menu can be displayed for each of the plurality of audio programs.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk, comprising:
    an audio data storage area for storing a plurality of pieces of audio data for at least one audio program;
    a still picture data storage area for storing a plurality of pieces of still picture data; and
    a management area for storing reproduction control information which defines a reproduction order of the plurality of pieces of audio data and a display order of the plurality of pieces of still picture data to be displayed simultaneously with the reproduction of the plurality of pieces of audio data, the reproduction order of the plurality of pieces of audio data and the display order of the plurality of pieces of still picture data being defined separately by the reproduction control information,
    wherein the reproduction control information has specified still picture information indicating specified still picture data to be independently displayed by a specified operation regardless of the display order of the plurality of pieces of still picture data.

2. An optical disk according to claim 1, wherein the specified still picture information represents that specified still picture data is not included in the plurality of pieces of still picture data.

3. A reproduction apparatus for reproducing information stored on the optical disk according to claim 1, the reproduction apparatus comprising:
    a reading section for reading the plurality of pieces of audio data and the plurality of pieces of still picture data from the optical disk; and
    a reproduction control section for controlling a display order of the plurality of pieces of still picture data to be displayed simultaneously with the reproduction of the plurality of pieces of audio data in accordance with the reproduction control information,
    wherein the reproduction control section specifies the specified still picture data among the plurality of pieces of still picture data in accordance with the specified still picture information.

4. A reproduction apparatus according to claim 3, wherein the specified still picture information represents that specified still picture data is not included in the plurality of pieces of still picture data.

5. A reproduction method for reproducing information stored on the optical disk according to claim 1, the method comprising the steps of:
    reading the plurality of pieces of audio data and the plurality of pieces of still picture data from the optical disk; and
    controlling a display order of the plurality of pieces of still picture data to be displayed simultaneously with the reproduction of the plurality of pieces of audio data in accordance with the reproduction control information,
    wherein the step of controlling includes the step of specifying the specified still picture data among the plurality of pieces of still picture data in accordance with the specified still picture information.

6. A reproduction method according to claim 5, wherein the specified still picture information represents that specified still picture data is not included in the plurality of pieces of still picture data.

7. A recording medium having recorded thereon a program for causing a reproduction apparatus to carry out a reproduction method for reproducing information stored on the optical disk according to claim 1, wherein the reproduction method includes the steps of:
    reading the plurality of pieces of audio data and the plurality of pieces of still picture data from the optical disk; and
    controlling a display order of the plurality of pieces of still picture data to be displayed simultaneously with the reproduction of the plurality of pieces of audio data in accordance with the reproduction control information,
    wherein the step of controlling includes the step of specifying the specified still picture data among the plurality of pieces of still picture data in accordance with the information.

8. A recording medium according to claim 7, wherein the specified still picture information represents that specified still picture data is not included in the plurality of pieces of still picture data.

* * * * *

UNITED STATES PATENT AND TRADEMARK OFFICE
CERTIFICATE OF CORRECTION

PATENT NO.    : 6,574,419 B1
DATED         : June 3, 2003
INVENTOR(S)   : Tomoyuki Nonomura et al.

It is certified that error appears in the above-identified patent and that said Letters Patent is hereby corrected as shown below:

Title page,
Item [54], Title, after "APPARATUS" should be a -- , --.
Item [56], References Cited, U.S. PATENT DOCUMENTS, "Paruiski" should be -- Parulski --; and "Hulzer et al." should be -- Huizer et al. --.

Signed and Sealed this

Seventh Day of October, 2003

JAMES E. ROGAN
*Director of the United States Patent and Trademark Office*